(12) United States Patent
Hanawa et al.

(10) Patent No.: US 7,136,013 B2
(45) Date of Patent: Nov. 14, 2006

(54) RADIO-WAVE RADAR SYSTEM AND ADAPTIVE CRUISE CONTROL SYSTEM

(75) Inventors: Kazuhiko Hanawa, Hitachinka (JP); Hiroshi Kuroda, Hitachi (JP); Kazuaki Takano, Mito (JP)

(73) Assignee: Hitachi, Ltd., Tokyo (JP)

( * ) Notice: Subject to any disclaimer, the term of this patent is extended or adjusted under 35 U.S.C. 154(b) by 287 days.

(21) Appl. No.: 10/625,642

(22) Filed: Jul. 24, 2003

(65) Prior Publication Data

US 2005/0242986 A1 Nov. 3, 2005

(30) Foreign Application Priority Data

Jul. 26, 2002 (JP) ............................. 2002-218234
Jul. 17, 2003 (JP) ............................. 2003-275888

(51) Int. Cl.
*G01S 13/42* (2006.01)
*G01S 13/93* (2006.01)

(52) U.S. Cl. ............................. 342/70; 342/82; 342/83; 342/84; 342/99; 342/109; 342/112; 342/130; 342/131; 342/132; 342/134; 342/137; 342/71; 342/111; 342/116

(58) Field of Classification Search ............ 342/70–72, 342/82–85, 98, 99, 102, 109–112, 115, 116, 342/127–132, 134, 135, 137

See application file for complete search history.

(56) References Cited

U.S. PATENT DOCUMENTS

| | | | |
|---|---|---|---|
| 5,087,918 A | 2/1992 | May et al. | |
| 5,325,097 A | 6/1994 | Zhang et al. | |
| 6,646,589 B1 * | 11/2003 | Natsume | 342/70 |
| 6,930,631 B1 * | 8/2005 | Puglia | 342/70 |
| 7,002,512 B1 * | 2/2006 | Isaji | 342/159 |
| 7,061,424 B1 * | 6/2006 | Kuroda et al. | 342/70 |
| 2003/0151542 A1 * | 8/2003 | Steinlechner et al. | 342/70 |
| 2003/0184469 A1 * | 10/2003 | Brosche | 342/70 |
| 2003/0210174 A1 * | 11/2003 | Nakamura | 342/70 |

FOREIGN PATENT DOCUMENTS

| | | |
|---|---|---|
| JP | 2000-292530 | 10/2000 |
| JP | 3203600 | 6/2001 |
| WO | WO-92/19980 A2 | 11/1992 |

OTHER PUBLICATIONS

European Search Report Mailed Nov. 26, 2003.

* cited by examiner

*Primary Examiner*—John B. Sotomayor
(74) *Attorney, Agent, or Firm*—Crowell Moring LLP

(57) ABSTRACT

In a radio wave radar system using a two-frequency CW modulation method, it is possible to detect a distance between a host vehicle and a forward vehicle and to realize a stable ACC following travel, even in a condition in which the relative speed is 0. By combining the two-frequency CW modulation method with the frequency pulse CW modulation method, that is, by using combination with the two-frequency CW method when the relative speed occurs and the frequency pulse CW method when the relative speed is close to 0, even if the relative speed is 0, the IF signal obtained from the reflected wave from the forward vehicle can be generated to detect the existence of the ACC target vehicle, so that it is possible to realize a stable ACC following travel.

23 Claims, 20 Drawing Sheets

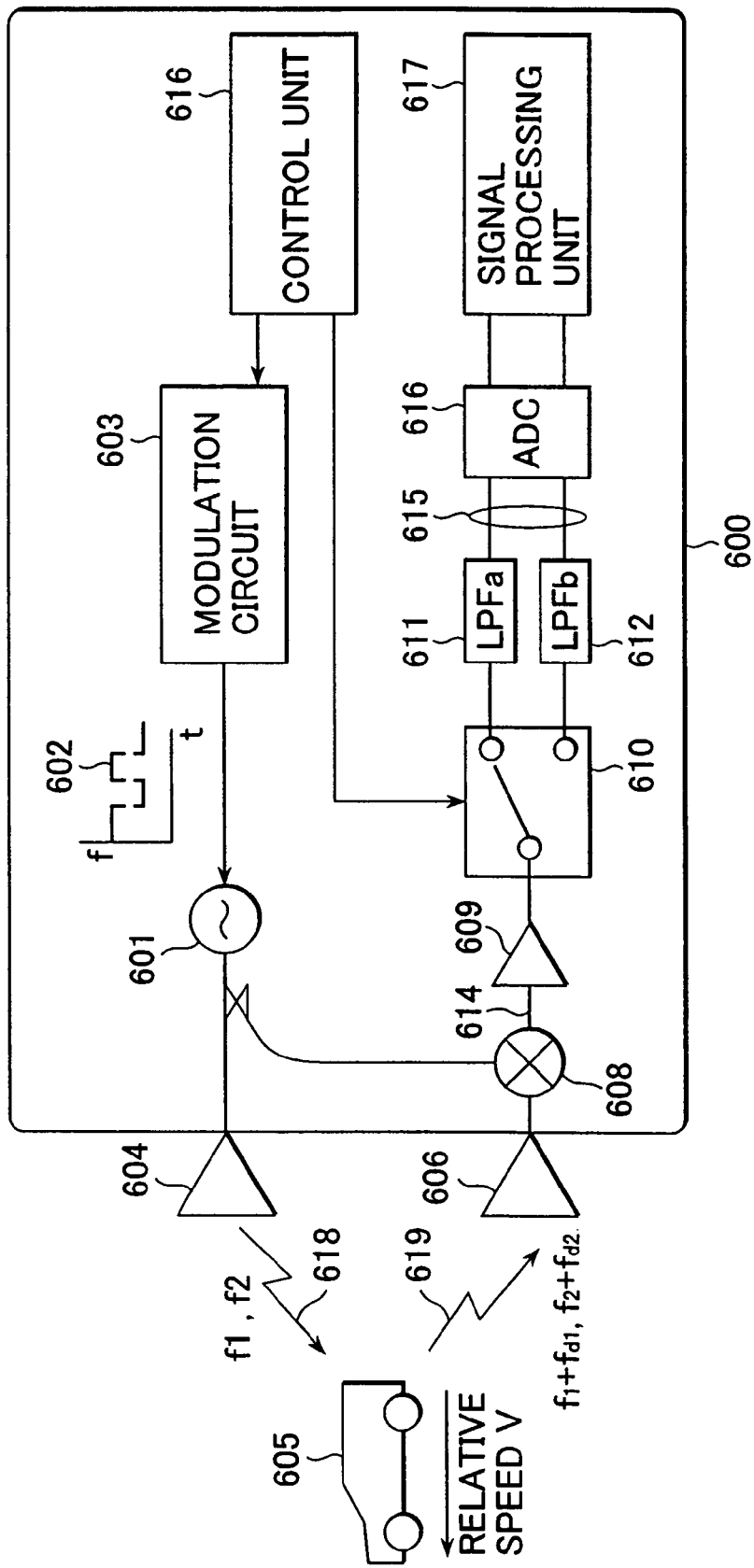
FIG.14 - PRIOR ART

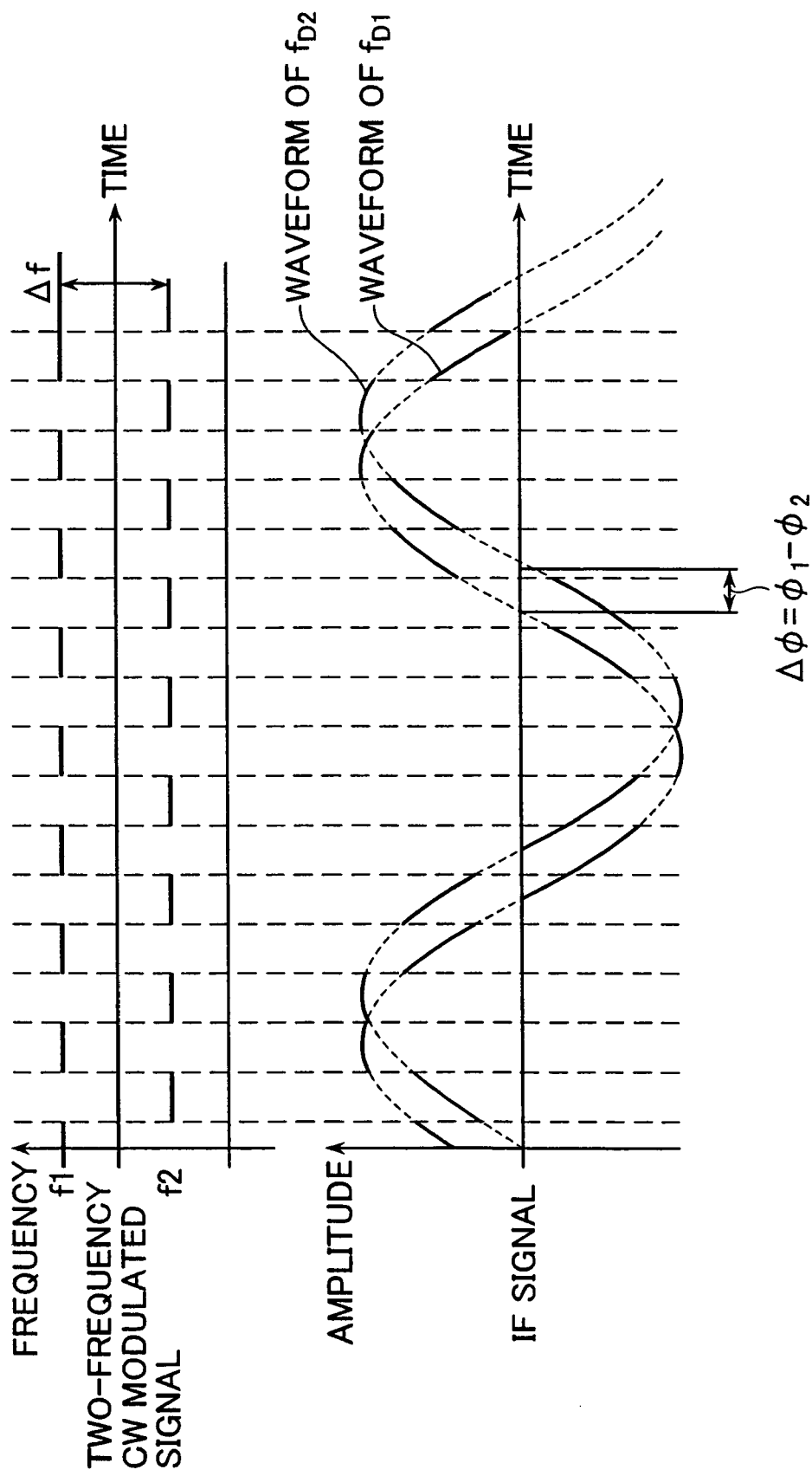
FIG.15 - PRIOR ART

FIG.16 - PRIOR ART
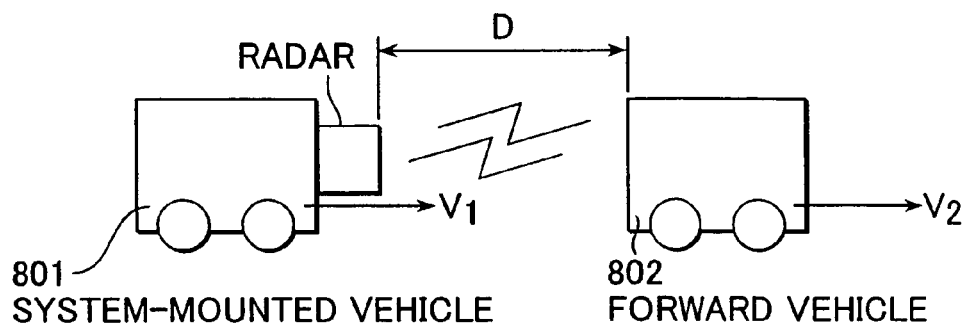
FIG.17 - PRIOR ART
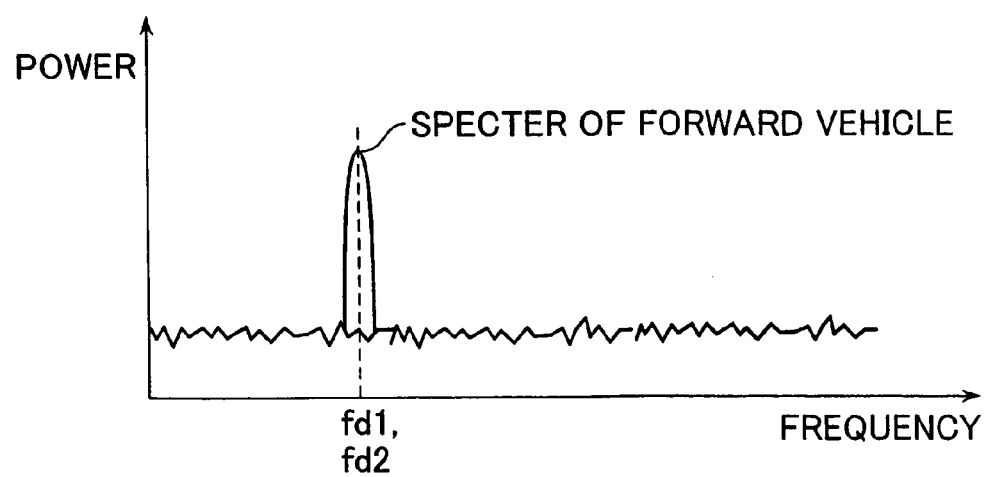

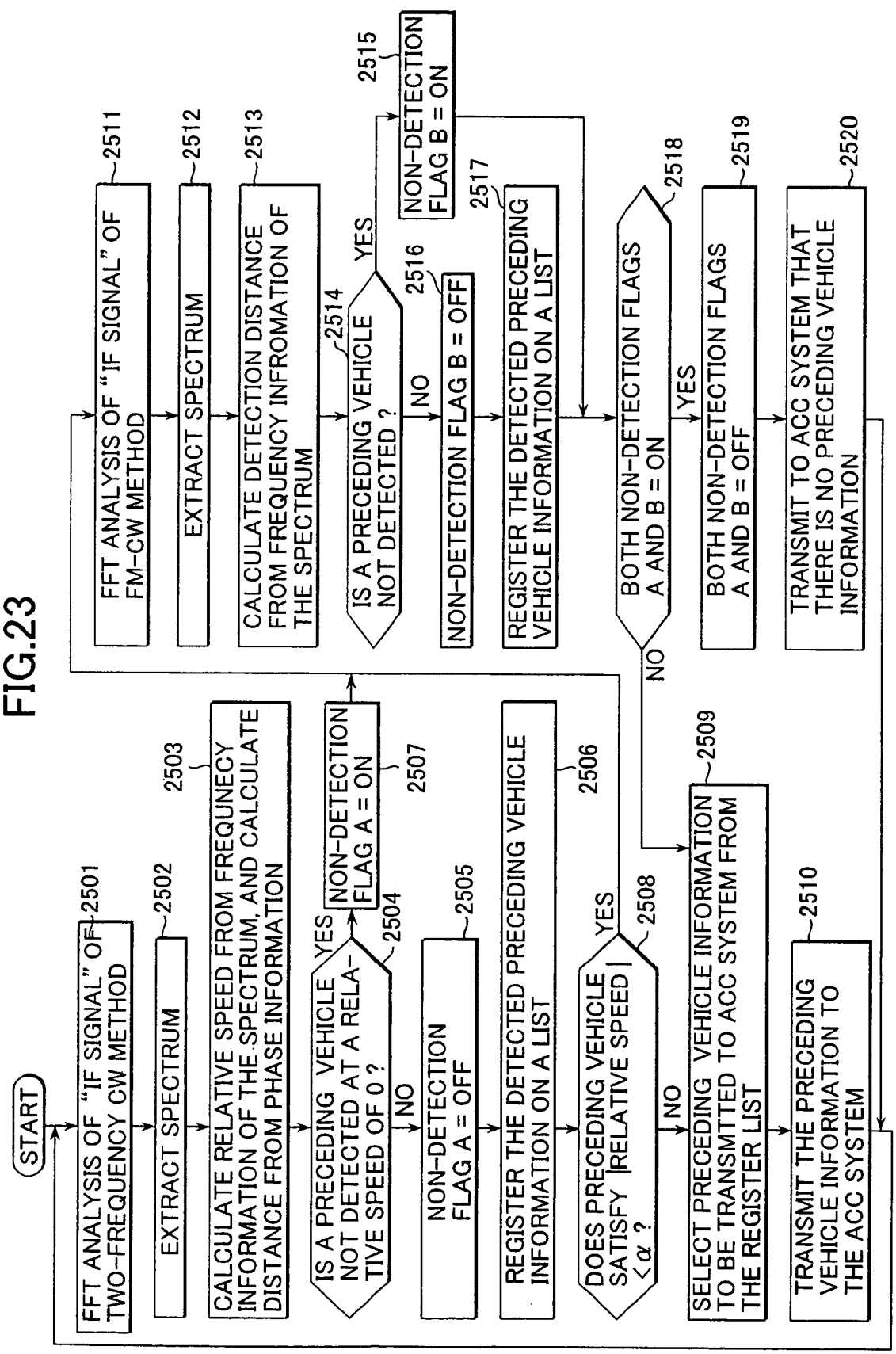

RADIO-WAVE RADAR SYSTEM AND ADAPTIVE CRUISE CONTROL SYSTEM

BACKGROUND OF THE INVENTION

1. Field of the Invention

The present invention relates to a radio wave radar system for detecting a distance or a relative speed between a host vehicle and an object such as a preceding vehicle or an obstacle, and application technologies thereof.

2. Description of the Related Art

Since attenuation of the radio beam is small even in case of bad weather such as rainy or misty weather, and thus the radio wave propagates to a long distance, the radio wave radar has been widely used in the fields of air traffic control, meteorological observation and the like. Recently, in the field of active safety of vehicles, a radio wave radar using millimeter wave bandwidths (hereinafter, referred to as "millimeter wave radar") for measuring a distance and a relative speed between a host vehicle and a preceding vehicle was studied, developed and commercialized.

There are several modulation methods used in millimeter wave radar, and a radar technology of two-frequency CW method disclosed in Japanese Patent Publication No. 3203600 is typical. The technology (the principle of detection) disclosed in the Patent Publication will be described with reference to FIGS. 14 to 17. FIG. 14 is a block diagram illustrating a constitutional example of a millimeter wave radar of a two-frequency CW method. As shown in FIG. 14, a millimeter wave oscillator 601 radiates a transmission signal 618 from a transmitting antenna 604, the transmission signal 618 being a modulation signal modulated by the modulation circuit 603 which generates a two-frequency CW modulation signal 602 and the modulation signal being modulated to switch two frequencies f1 and f2 alternatively by time division (here, $\Delta f = f2 - f1$).

The transmission signal having two frequencies is reflected from a preceding vehicle 605, and this reflected signal is input to a receiving antenna 606 as a reception signal 619. At that time, when there is a relative speed between the preceding vehicle 605 and the millimeter wave radar system 600, Doppler frequencies fd1 and fd2 are generated, and the frequencies of the reception signal 619 become f1+fd1 and f2+fd2, respectively. If the reception signal 619 passes through a mixer 608, the reception signal 619 becomes a time-divided signal (intermediate frequency signal (hereinafter, referred to as "IF signal")) including information of each of fd1 and fd2. The IF signal 614 is amplified by an amplifier 609, and then is divided in directions of two low pass filters LPFa 611 and LPFb 612 by a switch 610 being switched in synchronization with the two-frequency modulation signal 602. The two-frequency CW modulation signal 602 and the switch 610 are controlled by a control unit 616.

A relationship between the two-frequency CW modulation signal 602 shown in FIG. 14 and the IF signal 615 after passing through the low pass filters 611 and 612 is shown in FIG. 15. The IF signal 615 passing through the low pass filters 611 and 612 becomes two kinds of IF signals indicated by trochoidal curve of the time-divided IF signal 614 before passing through the switch 610. These signals are Doppler signals for the modulated frequencies f1, f2. If these Doppler signals are converted into discrete values by an ADC (AD converter) 616, and then the discrete values are analyzed with FFT by a signal processing unit 617, the frequencies fd1, fd2 and the phase differences $\Phi 1$, $\Phi 2$ can be obtained.

The relative speed V between the host vehicle and the preceding vehicle 605 can be obtained by Equation (1).

$$V = C \times fd1/(2 \times f1) \text{ or } V = C \times fd2/(2 \times f2) \tag{1}$$

Herein, C is a propagation speed of a radio wave, and when fd1<<f1, fd2<<f2 and $\Delta f$<<f1, fd1$\approx$fd2 can be approximated. Therefore, $V \approx C \times fd1/(2 \times f0)$, where f0=(f1+f2)/2.

In addition, a distance R between two vehicles can be expressed by Equation (2).

$$R = C \times (\Phi 1 - \Phi 2)/(4\pi \Delta f) \tag{2}$$

Herein, as shown in FIG. 16, if the traveling speeds of a host vehicle 801 and a preceding vehicle 802 existing at the fore are V1 and V2 (V1>V2), respectively, the relative speed V is (V1−V2). If the respective Doppler signal frequencies for this relative speed are fd1 and fd2, the frequency spectrum of power obtained by the FFT analysis of the signals is shown in FIG. 17. As shown in FIG. 17, a sharp peak of the power spectrum is observed on the frequency axis corresponding to the Doppler frequencies fd1, fd2. The relative speed V=(V1−V2) and the distance R between two vehicles can be obtained using Equations (1) and (2) on the basis of the frequency information and the phase information at the peak of the power spectrum.

According to the signal processing in the two-frequency CW method described above, a spectrum is detected from the result of the FFT analysis, one spectrum corresponding to one preceding vehicle is observed as shown in FIG. 17, and the relative speed V from the frequency information and the distance R between vehicles from the phase information can be concurrently obtained. Hence, a stable detection of a preceding vehicle can be realized without a complex signal process.

SUMMARY OF THE INVENTION

However, the following problems occur for the technology that uses the two-frequency CW method.

An adaptive cruise control system (hereinafter, referred to as ACC system) which uses a millimeter wave radar as a distance sensor is very effective for a safe driving or an automatic traveling. The ACC system controls the distance between the host vehicle and the preceding vehicle to be constant depending on the speed of the host vehicle.

Since the ACC system controls the distance between vehicles to be constant, a situation may occur in which the relative speed between the host vehicle and the preceding vehicle is "0" when the preceding vehicle is traveling at a constant speed. Since the frequency of a Doppler signal is "0" when the relative speed is "0" in the two-frequency CW method, the frequency of an IF signal is "0", and thus a situation that cannot detect the preceding vehicle may occur.

FIG. 18 shows examples of time variation of the distance between the host vehicle and the preceding vehicle, the relative speed between the two vehicles and the speed of the host vehicle. The ACC system controls the speed of the host vehicle to match a speed set up by a driver when a preceding vehicle is not present, and if the millimeter wave radar detects a preceding vehicle, the ACC system of the host vehicle starts to decelerate to keep the distance between the two vehicles constant (point A in FIG. 18) when the set-up speed of the preceding vehicle is lower than the speed of the host vehicle. Next, when the speed of the host vehicle is equal to that of the preceding vehicle and the relative speed is 0, the millimeter wave radar loses sight of the preceding vehicle by means of the aforementioned principle (point B in FIG. 18).

At that time, the ACC system cannot detect the preceding vehicle, thus the ACC system starts to accelerate up to the original set-up speed again. If the host vehicle accelerates, the relative speed between the preceding vehicle and the host vehicle is generated again, and thus the millimeter wave radar can detect the preceding vehicle (acquire the preceding vehicle) (point C in FIG. 18).

Next, the host vehicle decelerates again by the ACC system, the control for keeping the distance constant with the preceding vehicle is started, the relative speed is "0" again, and the millimeter wave radar loses sight of the preceding vehicle again (point D in FIG. 18). Similarly, except for a case in which the preceding vehicle departs from a detection range by changing lanes, etc., the acquisition, the non-detection and the re-acquisition are repeated as shown in FIG. 18.

As described above, if the speed control is performed combining the millimeter wave radar of the two-frequency CW method with the ACC system, the millimeter wave radar loses sight of the preceding vehicle, and the acceleration and the deceleration of the host vehicle occur frequently, so that a traveling that damages driver's comfort may occur while traveling by following the preceding vehicle.

Accordingly, it is an object of the present invention to provide a millimeter wave radar system and application technologies thereof for realizing a stable traveling under control of an ACC system.

According to one aspect of the present invention, a radio wave radar system is provided for obtaining at least one of a distance and a relative speed to a forward object, and the radio wave radar system comprises modulation means for modulating a transmitting radio wave frequency, means for identifying a phase information and a frequency information of a received reflection wave corresponding to the transmission frequency, and control means for switching modulation methods in the modulation means depending on variation of the relative speed to the forward object.

It is preferable that the control means switches a two-frequency CW modulation method and a frequency pulse CW modulation method, wherein the two-frequency CW modulation method performs a modulation two frequencies with the two frequencies switched alternately and is suitable for a case in which the relative speed to the forward object is higher than a predetermined threshold value, and the frequency pulse continuous CW modulation method performs a modulation into at least two types of separate frequencies only for a short time interval at a predetermined constant frequency and is suitable for a case in which the relative speed between the host vehicle and the preceding object is lower than a predetermined threshold value. Herein, the threshold value can be obtained using a measurement limit value in the two-frequency CW modulation method as a reference.

Furthermore, according to another aspect of the present invention, a radio wave radar system comprising the control means is provided, the control means using the two-frequency CW modulation method and the FM-CW modulation method, in which, a frequency is linearly modulated at a predetermined frequency width when the relative speed between the host vehicle and the preceding vehicle is lower than the predetermined threshold value, to switch said two modulation means depending on the relative speed. Herein, the threshold value can be obtained on the basis of the measurement limit value in the two-frequency CW modulation method.

That is, according to the present invention, the distance between the host vehicle and the preceding vehicle can be detected continuously without missing, and the inter-vehicle distance can be obtained by a signal process having a light load.

BRIEF DESCRIPTION OF THE DRAWINGS

FIG. 14 is a constitutional example of a millimeter wave radar of a two-frequency CW method;

FIG. 15 is a view illustrating a relationship between a two-frequency CW modulation signal and an IF signal;

FIG. 16 is a view illustrating a relationship between a host vehicle and a preceding vehicle;

FIG. 17 is a view illustrating a frequency spectrum of the IF signal;

FIG. 23 is a flowchart of the millimeter wave radar system when the two-frequency CW modulation method and the FM-CW modulation method are used in combination.

DESCRIPTION OF THE PREFERRED EMBODIMENTS

Before explaining embodiments of the present invention, the inventor's ideas will be described. When a preceding vehicle is monitored using a two-frequency CW method, in case the preceding vehicle is not detected by the two-frequency CW method, it is not necessary to accurately detect the distance between the host vehicle and the preceding vehicle. In addition, it is preferable to know whether the cause of non-detection is because the preceding vehicle is not really present or because the relative speed between the host vehicle and the preceding vehicle is low and thus the preceding vehicle cannot be detected simply by the two-frequency CW method.

The inventor considered the cause may be determined to be the former or the latter by forwardly radiating a modulation signal of which an oscillating frequency is modulated into a pulse shape and receiving the signal again. That is, the inventor considered that the above problems could be solved by combining with a technique capable of detecting existence or nonexistence of a preceding vehicle when the relative speed between the host vehicle and the preceding vehicle becomes low while utilizing advantages of the two-frequency CW method.

Now, on the basis of the aforementioned idea, a radio wave radar system, a control system of a distance between the two vehicles, and an adaptive cruise control (ACC) system according to a first embodiment of the present invention will be described with reference to the drawings.

Figure 1:
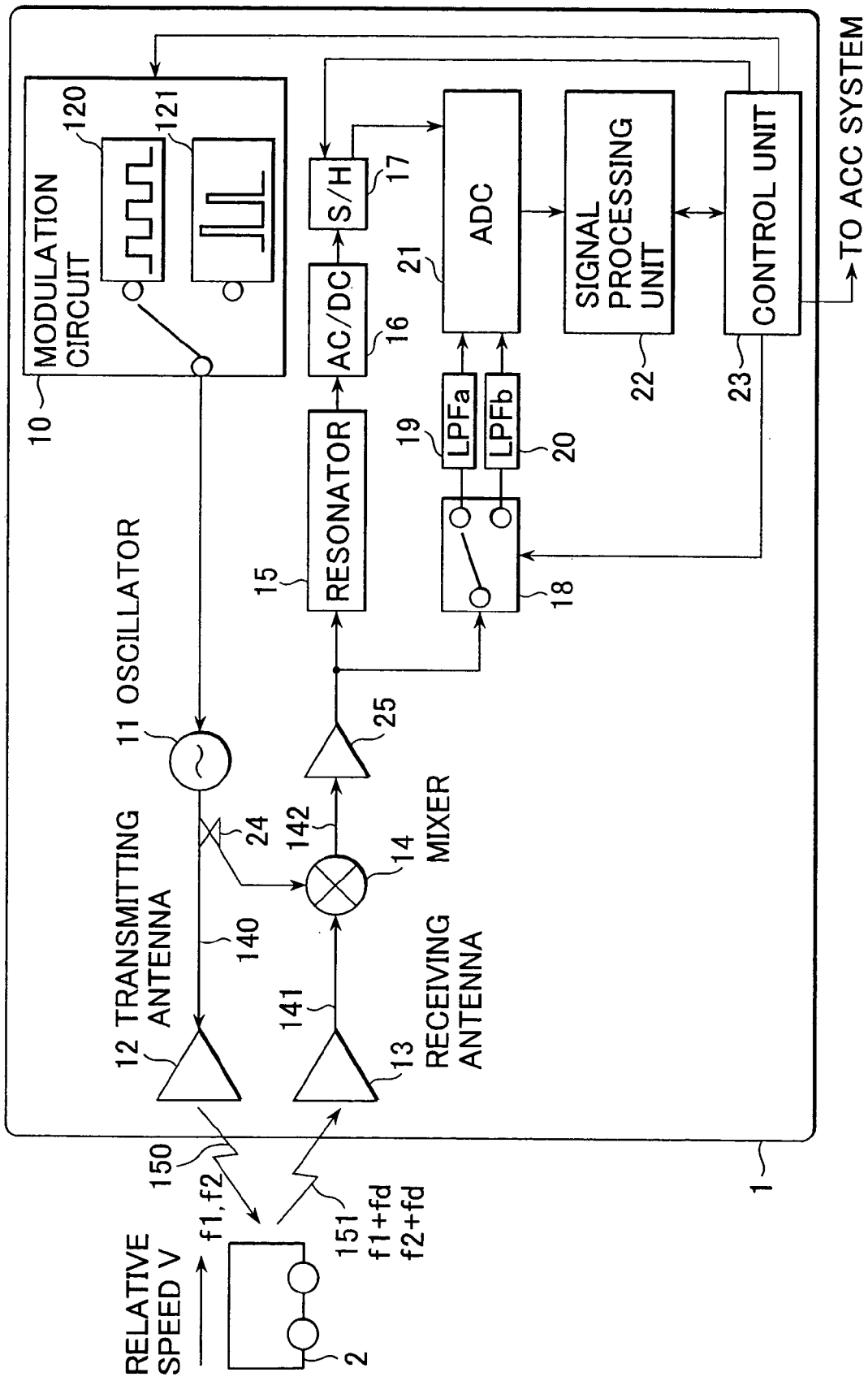
FIG. 1 is a block diagram of a millimeter wave radar system according to one embodiment of the present invention.

FIG. 1 is a functional block diagram of a millimeter wave radar system according to this embodiment.

The millimeter wave radar system 1 comprises an oscillator 11 for oscillating a millimeter wave transmission signal 140, a transmitting antenna 12 for radiating a millimeter wave transmission radio wave 150, a modulation circuit 10 for modulating the oscillating frequency, a receiving antenna 13 for receiving a millimeter wave transmission radio wave 151 reflected from a preceding vehicle 2, a mixer 14 for receiving the transmission signal 140 and the reception signal 141 and for generating an IF signal 142, an amplifier 25 for amplifying the IF signal, a resonator 15 for passing only an arbitrary band frequency signal, an AC/DC converter 16 for converting an AC signal into a DC signal, an S/H circuit (sample hold circuit) 17, a modulation circuit 10 for performing the switching of a modulation signal 120 and a modulation signal 121, a switch circuit 18, a control unit 23 for controlling the modulation circuit 10, the S/H circuit 17 and the switch circuit 18, an ADC circuit (AD converter) 21 for receiving signals from the S/H circuit 17, an LPFa 19 and an LPFb 20 (both are low pass filters), and a signal processing unit 22 for receiving a digital signal value of the IF signal from the ADC circuit 21 and calculating a distance and a relative speed between the host vehicle and the preceding vehicle.

Next, a preceding vehicle detection means according to this embodiment will be described. In this embodiment, the signal processing of a general two-frequency CW method and a newly invented frequency pulse CW method (details will be described later) is used in combination. That is, when the absolute value of the relative speed V between the host vehicle and the preceding vehicle is equal to or greater than a predetermined value, the detection of the preceding vehicle is performed using the general two-frequency CW method. Now, operational principles thereof will be described.

Referring to FIG. 1, when the relative speed V between the preceding vehicle and the host vehicle is equal to or greater than a predetermined value, the millimeter wave radar is operated by the two-frequency CW method. The millimeter wave transmission signal 140 (frequencies are f1 and f2) generated from the millimeter wave oscillator 11 is radiated from the transmitting antenna 12 through a directional coupler 24. The directional coupler 24 distributes a portion of the transmission signal into the mixer 14. The oscillating frequency of the millimeter wave oscillator 11 is modulated into two-frequency modulation signal 120 by the modulation circuit 10. The control unit 23 selects the modulation signal. The oscillating frequency of the millimeter wave oscillator 11 is modulated to alternately switch the two kinds of frequencies f1, f2 by the two-frequency CW modulation signal 120.

Signals subjected to the Doppler shift by the preceding vehicle 2 out of the signals radiated from the transmitting antenna 12 become a millimeter wave reception signals 151 (of which frequencies are f1+fd, f2+fd). The millimeter wave reception signals 151 are received as reception signals 141 by the receiving antenna 13. The reception signal 141 is mixed with a portion of the transmission signals 140 distributed by the directional coupler 24 in the mixer 14 to be the IF signal 142 (including Doppler signal (frequency is fd)) and to be amplified by the amplifier 25.

When the two-frequency CW signal 120 is selected as a modulation signal, an analog switch 18 is switched in synchronization with the two-frequency modulation signal 120. That is, the switch 18 is switched such that the IF signal 142 is input toward the direction of LPFa 19 when the frequency of the millimeter wave oscillator 11 is f1 and the IF signal 142 is input toward the direction of LPFb 20 when the frequency of the millimeter wave oscillator 11 is f2. The LPFa 19 generates a Doppler signal (frequency is fd1) when the frequency of the millimeter wave oscillator 11 is f1, and the LPFb 20 generates a Doppler signal (frequency is fd2) when the frequency of the millimeter oscillator 11 is f2.

The Doppler signals are converted into discrete values by the ADC 21 and these values are analyzed with FFT by the signal processing unit 22, so that the frequency fd1 and phase Φ1 and the frequency fd2 and phase Φ2 of the Doppler signals can be obtained.

Herein, the distance R and the relative speed V between the host vehicle and the preceding vehicle 2 can be calculated by Equation (3).

$$V = C \times fd1/(2 \times f1) \text{ or } C \times fd2/(2 \times f2) \tag{3}$$

where C is a propagation speed of a radio wave.

In addition, the distance R between the two vehicles can be calculated by the following equation.

$$R = C \times (\Phi 1 - \phi 2)/(4\pi \Delta f) \tag{4}$$

Herein, information of the distance and the relative speed on the detected preceding vehicle is sent to an external ACC system, etc. through a serial communication means, etc. and the ACC system controls a traveling of the vehicle.

Next, a detection method when the absolute value of the relative speed is less than a predetermined value or is "0" will be described. As described above, the preceding vehicle is detected using the Doppler signals in the two-frequency CW method. However, the preceding vehicle cannot be detected when the relative speed is close to "0". Therefore, it is necessary to introduce the modulation method capable of obtaining the IF signal of the preceding vehicle even if the relative speed is "0". This modulation method is a frequency pulse CW method that converts the frequency into the form of a pulse.

Figure 2:
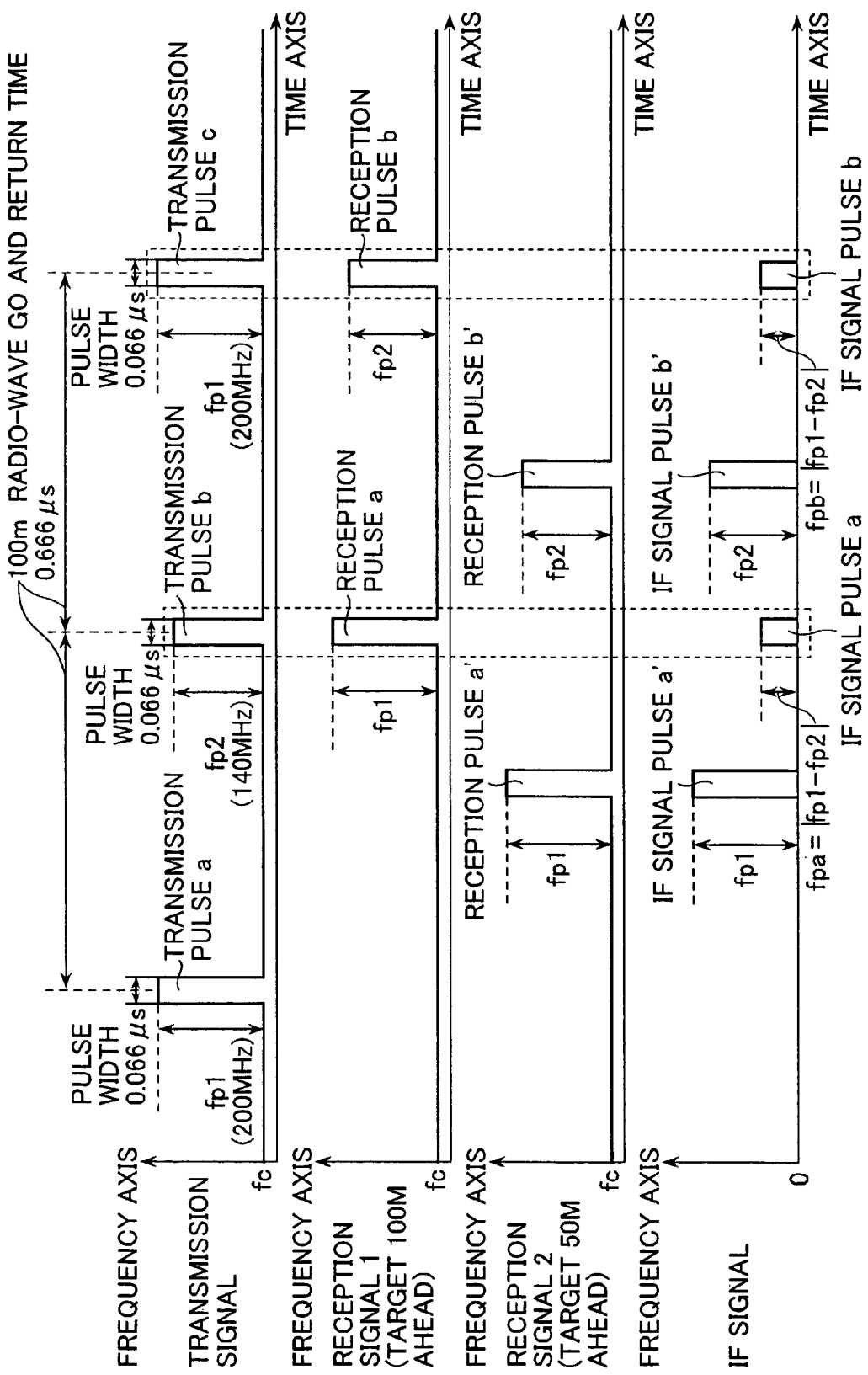
FIG. 2 is a principle diagram of a frequency pulse CW method in a millimeter wave radar system according to one embodiment of the present invention.

Next, the principle of the object detection means by the frequency pulse CW method will be described with reference to FIGS. 2 and 3. As shown in FIG. 2, in the frequency pulse CW method, typically, the transmission signal of transmission frequency fc is radiated, but it is switched into an oscillating frequency fp1 (200 MHz in FIG. 2) or fp2 (140

MHz in FIG. 2) with an arbitrary period T (0.666 μs in FIG. 2) and an arbitrary time interval (0.066 μs in FIG. 2).

Figure 3:
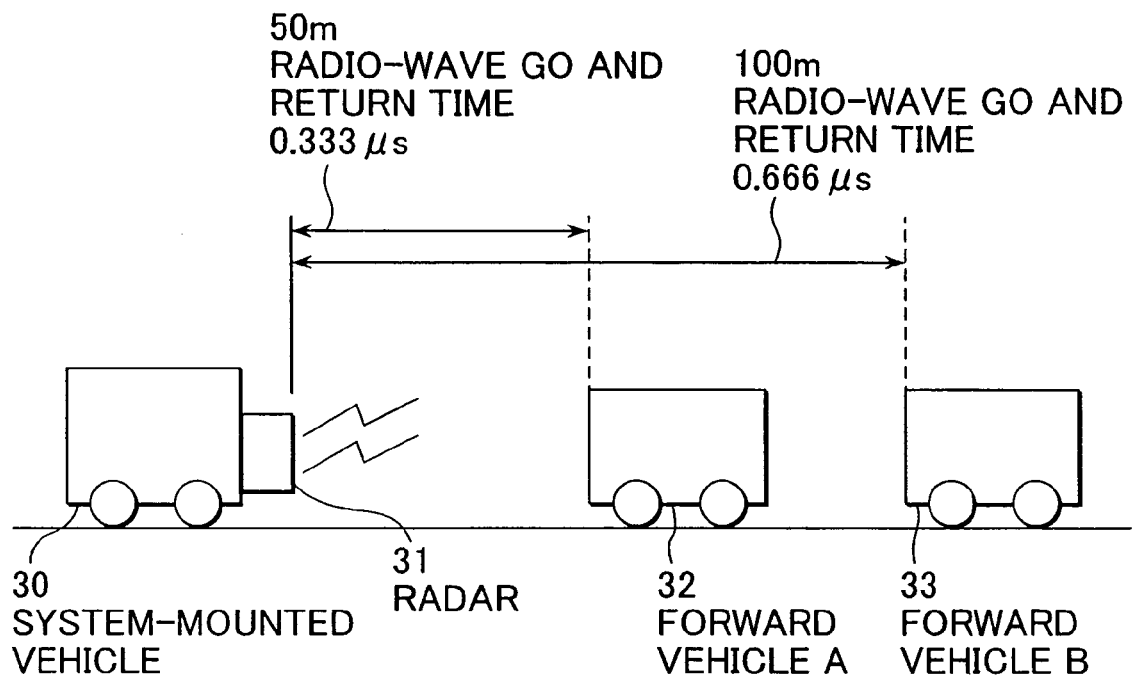
FIG. 3 is a view illustrating a relationship with respect to positions between a host vehicle and a plurality of preceding vehicles.

As shown in FIG. 3, when a plurality of objects exist at positions (for example, a preceding vehicle A32 exists 50 m ahead and a preceding vehicle B33 exists 100 m ahead as shown in FIG. 3) in front of the host vehicle 30 equipped with the radar 31 with arbitrary distances apart, a reception signal 1 and a reception signal 2 as shown in FIG. 2, respectively, are reflected from the preceding vehicle. The reception signal 1 generates a reception pulse a and a reception pulse b, and the reception signal 2 generates a reception pulse a' and a reception pulse b'. Here, the reception pulse a and the reception pulse a' are signals obtained from a reflected wave of a transmission pulse a from the objects, and the reception pulse b and the reception pulse b' are signals obtained from reflection of the transmission pulse b from the objects. The respective pulse frequencies are as follows:

A frequency of the transmission pulse a: $fc+fp1$ (5)

A frequency of the transmission pulse b: $fc+fp2$ (6)

A frequency of the transmission pulse c: $fc+fp1$ (7)

Frequencies of the reception pulses a and a': $fc+fp1$ (8)

Frequencies of the reception pulses b and b': $fc+fp2$ (9)

Herein, the delay times between the transmission pulse and the reception pulses from the preceding vehicle A and the preceding vehicle B are 0.333 μs and 0.666 μs, respectively. In FIG. 2, if the time interval of the transmission pulses a, b, c is set up to 0.666 μs such that the transmission timing of the transmission pulse b, the reception timing of the reception pulse a reflected from the preceding vehicle B33, the transmission timing of the transmission pulse c and the generation timing of the reception pulse b reflected from the preceding vehicle B33 are synchronized, the IF signal pulses a, a', b, b' are generated from the transmission pulses a, b, c and the reception pulses a, a', b, b', respectively. Herein, the respective frequencies of the IF signals have differences of the transmission signal and the reception signal, and the following relationships are established.

A frequency of the IF signal a: $fpa=(fp1-fp2)$ (10)

A frequency of the IF signal a': $fp1$ (11)

A frequency of the IF signal b: $fpb=(fp1-fp2)$ (12)

A frequency of the IF signal b': $fp2$ (13)

Therefore, the frequencies of the IF signal pulses a, a b, b' are fp1, fpa, fp2, fpb, respectively. The IF signal pulses a', b' are generated from the reception signal 2 from the preceding vehicle A32, and the IF signal pulses a, b are generated from the preceding vehicle B33. Herein, the frequencies fp1, fp2 of the transmission pulses are determined such that the frequencies fp1, fpa, fp2, fpb of the IF signal pulses have the following relationships.

$fpa=fpb$ (14)

$fp1=fp2+fpa$ (15)

$fpa<fp1$ (16)

$fpb<fp1$ (17)

Herein, the frequencies fpa and fpb are set lower than fp1 and fp2. In the course of processing the IF signals, only the frequencies fpa and fpb can be extracted using a band filter for passing the only fpa and fpb. These fpa and fpb are frequencies of the IF signals generated because the object exists 100 m ahead. Since only the IF signals of fp1 and fp2 higher than the fpa and fpb are obtained from the preceding vehicle, these IF signals cannot pass through the band filter. Therefore, the fact that the fpa and fpb which are frequencies of the IF signals can be obtained indicates that an object exists 100 m ahead.

The IF signals of the object of the preceding vehicle B33 (100 m ahead) are extracted from the example shown in FIG. 2, but the IF signals of a preceding vehicle with any distance ahead can be obtained by controlling the pulse period. For example, if the pulse generation time interval is 0.333μs, the IF signal frequency of the preceding vehicle A32 (50 m ahead) can be obtained. In a word, the IF signal of an object which is a target can be obtained by varying the frequency pulse generation time interval. Since the frequency pulse generation time interval corresponds to the reciprocating time of radio wave, the following equation is established.

$$\tau=2\times D/C \quad (18)$$

where τ is a pulse modulation time interval, D is a distance to an object of which IF signals are to be obtained, and C is the speed of light, i.e., $3\times10^8$ m/s.

As described above, from the relationship between the pulse generation time interval and the existence or nonexistence of IF signals, the existence of a forward object with an arbitrary distance ahead can be detected. The relationship between the pulse period and the IF signal output (output of the S/H circuit) is shown in FIG. 4.

Figure 4:
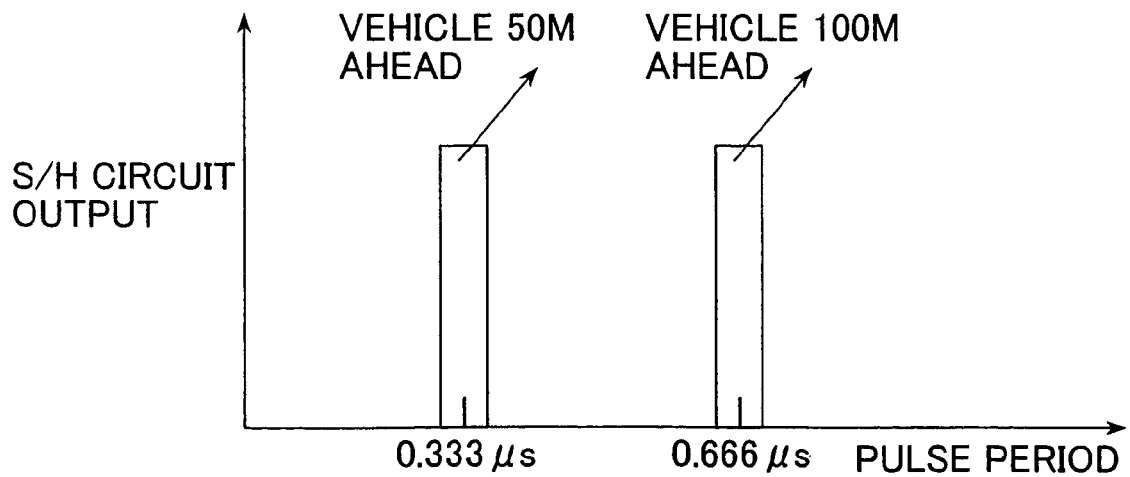
FIG. 4 is a view illustrating a relationship between a pulse time interval of frequency pulse CW modulation and an S/H circuit output.

If two cars exist 50 m ahead and 100 m ahead as shown in FIG. 3, the spectrum of the IF signals can be obtained at 0.333 μs and 0.666 μs on the horizontal axis (pulse time interval) in FIG. 4.

As described above, with the frequency pulse CW modulation, even if the relative speed is 0, the IF signals can be obtained, so that it is possible to detect a preceding vehicle.

A wave detection method of the frequency pulse CW method will be described with reference to FIGS. 1, 2 and 11. The IF signal conversion of this wave detection method is performed through a path of the amplifier 25, the resonator 15, the AC/DC converter 16 and the S/H circuit 17 in FIG. 1. If the relative speed between the preceding vehicle and the host vehicle is generated, the millimeter wave radar system 1 detects the distance and the relative speed between the host vehicle and the preceding vehicle 2 using the two-frequency CW modulation signal 120.

When the absolute value of the relative speed between the host vehicle and the preceding vehicle that is a ACC target is less than a predetermined value or is 0 and thus the preceding vehicle cannot be detected by the two-frequency CW modulation method, the modulation method is switched to the frequency pulse CW modulation signal 121. The pulse interval is determined by the equation (18) on the basis of the distance information obtained by the two-frequency CW method before the preceding vehicle cannot be detected any more.

Figure 11:
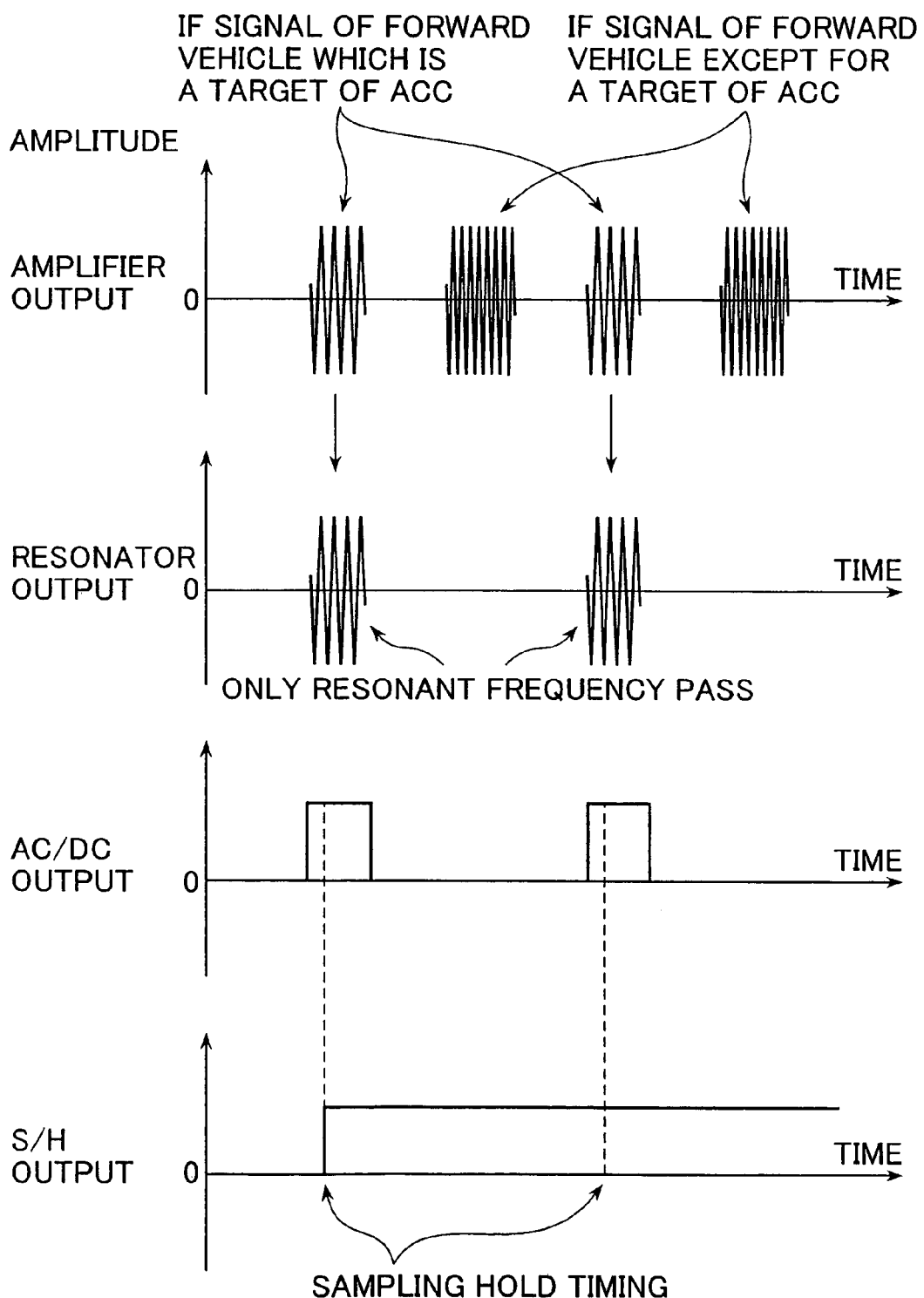
FIG. 11 is a view illustrating signals to be processed in a circuit of a frequency pulse CW method.

When the preceding vehicle 2, i.e., the ACC target and other vehicles exist, the IF signals shown as the amplifier output in FIG. 11 can be obtained. The IF signal of the ACC target vehicle is fpa or fpb as shown in FIG. 2, and these frequency signals pass through the resonator output. However, the IF signals having frequencies other than the frequencies fpa and fpb are removed, and thus the resonator output shown in FIG. 11 can be obtained.

Next, the AC signals of the IF signals are converted into the DC signals by the AC/DC converter, and thus the rectangular shaped signals shown as the AC/DC output in FIG. 11 can be obtained. Next, if the sample hold of signals is performed by the S/H circuit at a timing the rectangular shaped signals exist, a constant voltage signal can be obtained from the S/H circuit. The sample hold timing of the S/H circuit 17 is controlled by the control unit 23, and is synchronized with the output timing of the frequency pulse CW signals of the modulator.

The output of the S/H circuit 17 is converted into a digital signal through the ADC 21, and then the signal processing is performed in the signal processing unit 22. The signal processing unit can determine whether the preceding vehicle, i.e., the ACC target exists within a target distance only by checking whether the output of the S/H circuit 17 is ON or OFF, a simple signal processing means may be used.

Figure 5:
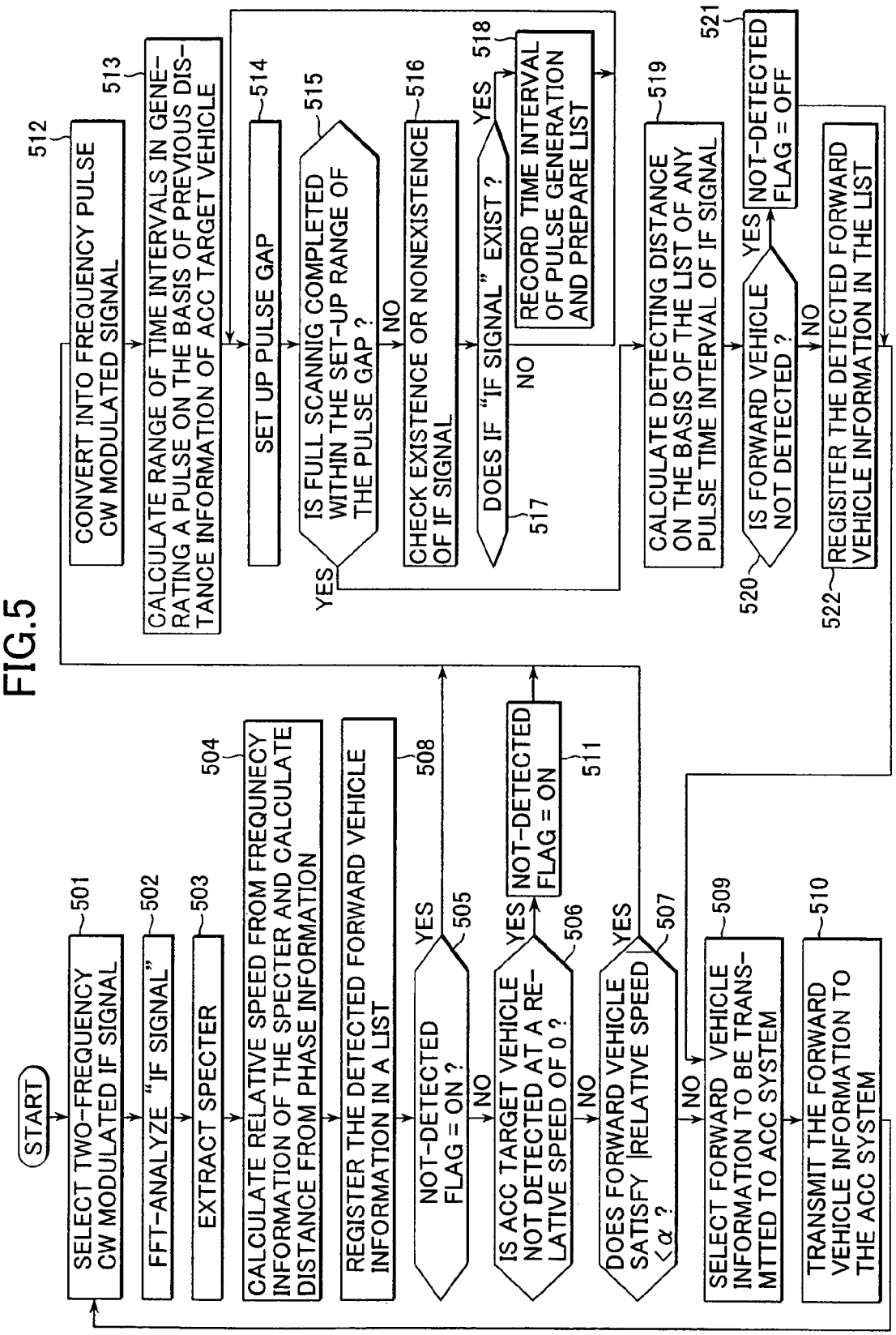
FIG. 5 is a flowchart illustrating a flow of a process for switching modulation methods in a millimeter wave radar system according to one embodiment of the present invention.

Next, with reference to FIG. 5, the control flow by the radio wave radar system according to an embodiment of the present invention will be described.

At the start of the ACC, the two-frequency CW modulation signal is selected (step 501). Next, the IF signals are analyzed by FFT (step 502), and a spectrum is extracted (step 503). The relative speed is calculated from the frequency information of the spectrum, and the distance is calculated from the phase information (step 504). Subsequently, the preceding vehicle information detected by the two-frequency CW method is registered on a list (step 508).

Next, ON/OFF of a non-detection flag is judged (step 505). This non-detection flag is ON if the ACC target vehicle is not already detected because the relative speed is 0 and the like as a result of the previous process.

If the non-detection flag is ON, the step 512 is performed to switch the modulation method into the frequency pulse CW modulation method. If the non-detection flag is OFF, it is determined in the step 506 whether the ACC target vehicle that was detected in the previous process is not detected due to the relative speed of 0. If the target vehicle is not detected, the non-detection flag is made to be ON (step 511) and the step 512 is performed.

When the relative speed is not 0 and the detection of vehicle continues, and also if the absolute value of the relative speed is equal to or less than a in step 507, the step 512 is performed. This is because the consecutive detection for the preceding vehicle is to be ensured by using two kinds of modulation methods in combination within a range in which the absolute value α of the relative speed is close to 0.

When the ACC target vehicle is missed in detection of the two-frequency CW method and then the modulation method is switched to the frequency pulse CW method, time is required until re-detection by the frequency pulse CW method since a bad effect on the control property of the ACC is prevented.

When the frequency pulse CW method is selected, the pulse modulation signal is switched (step 512) and a range of the pulse generation time interval is calculated from the distance information of the ACC target vehicle that was previously detected (step 513). A distance range is calculated by multiplying the distance to the ACC target vehicle detected in the previous process by an arbitrary ratio, and then the pulse generation time interval varies to scan back and forth of the distance to the ACC target vehicle detected in the previous process. This is because when the ACC target vehicle is missed and then moves by other distance for a short time, the ACC target vehicle may be missed by a pin point detection of only a distance to one point.

In the step 514, the first pulse interval is set up, and in the step 515, existence or nonexistence of the IF signals is continuously checked until the scanning within the pulse set-up range calculated in the step 513 is completed (step 516). When the IF signals exist (step 517), the pulse generation time interval is recorded (step 518), and the next pulse generation time interval is set up (step 514). When the scanning within the pulse set-up range is completed (step 515), the detected distance of the preceding vehicle is calculated from the pulse generation time interval when the IF signals can be confirmed (step 519).

When the IF signals cannot be confirmed even by the frequency pulse CW method, it is determined that the preceding vehicle has changed its lane to other lane to depart from the radar detection area, and by setting the non-detection flag to OFF, the detection by the frequency pulse CW method is stopped. When the IF signals can be detected by the frequency pulse CW method, the information of the detected preceding vehicle is registered on the list (step 522).

The preceding vehicle information to be transmitted to the ACC system is selected from the information list of the preceding vehicle (by steps 508 and 522) which is registered by the two kinds of detection methods (step 509), and then the preceding vehicle information is transmitted to the ACC system (step 510).

Summarizing the above processes, when the ACC target vehicle exists at the fore and the relative speed is equal to or greater than a predetermined value, the distance and the relative speed to the vehicle are calculated using only the detection method of the two-frequency CW method. When the absolute value of the relative speed of the ACC target vehicle is α to 0 or when the ACC target vehicle is not detected, the detection method of the frequency pulse CW method is used in combination with the two-frequency CW method. By doing so, the optimal ACC target vehicle is detected from the detection results obtained form the two methods, and the vehicle information is transmitted to the ACC system.

Figure 6:
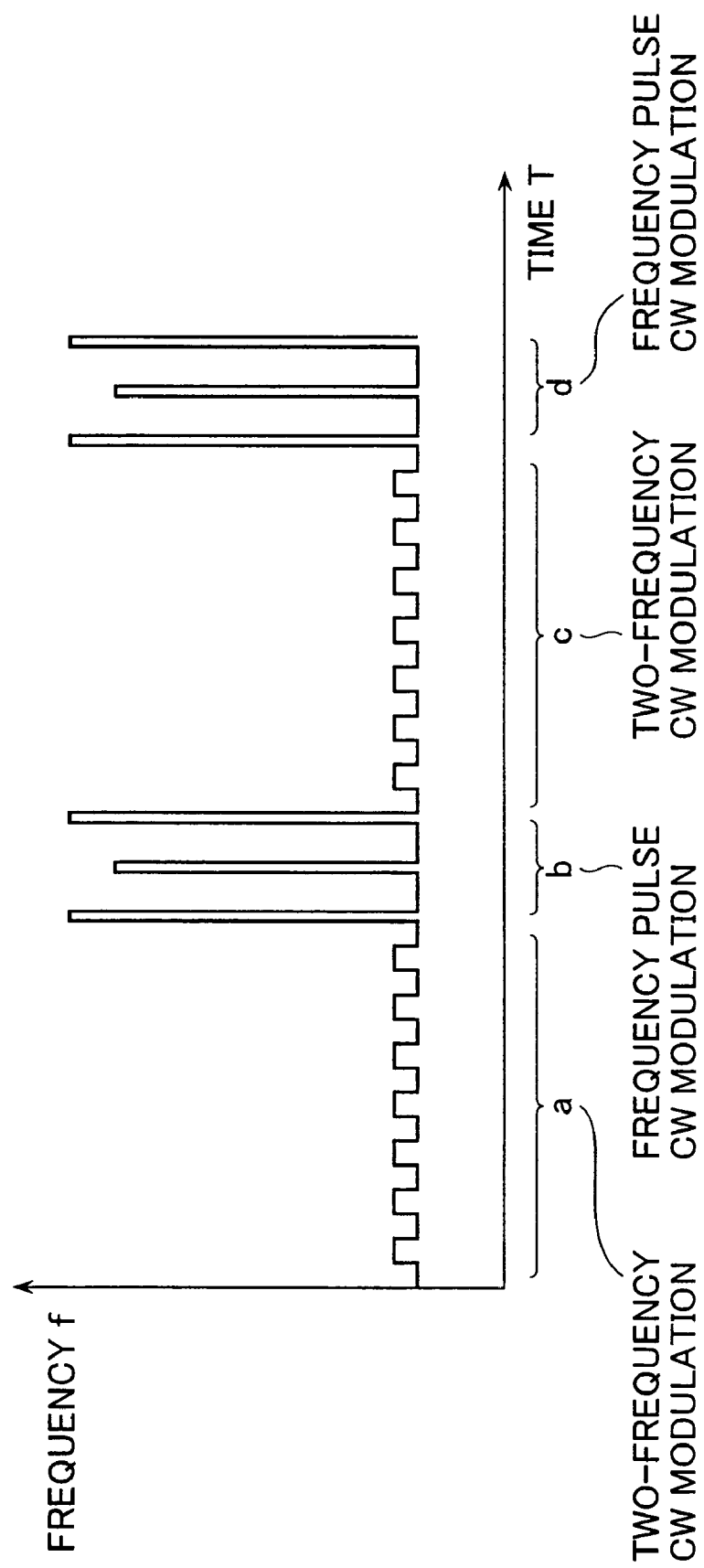
FIG. 6 is a view illustrating an example of a transmission frequency switching in a millimeter wave radar system according to one embodiment of the present invention.

FIG. 6 shows the switching of the transmission signal frequency through the selection of the frequency modulation methods of the transmission signals. The intervals a, c are the modulation intervals by the two-frequency. CW modulation method. When the absolute value of the relative speed to the ACC target, i.e., the preceding vehicle is equal to or greater than a predetermined value, only this method is selected. Furthermore, the intervals b, d are the modulation intervals by the frequency pulse CW modulation method, and when the absolute value of the relative speed is equal to or less than a predetermined value or is 0 (when the Doppler signal cannot be obtained), the frequency pulse CW modulation method and the two-frequency CW modulation method may be used in combination.

Next, another radar detection method using the frequency pulse CW modulation will be described with reference to FIGS. 8 and 9.

Figure 8:
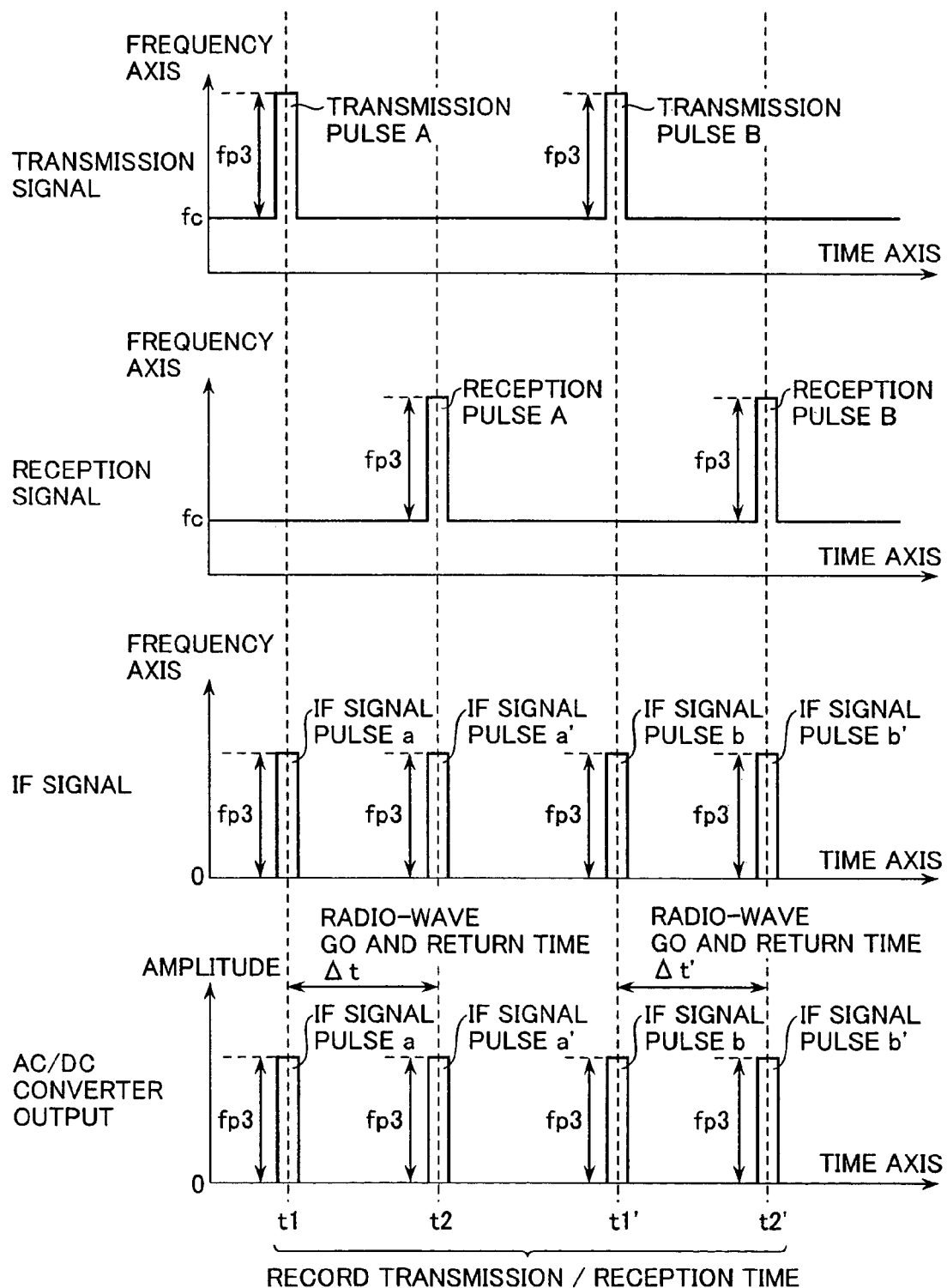
FIG. 8 is a view illustrating frequency variations of a transmission signal and a reception signal in a millimeter wave radar system according to a modified example of one embodiment of the present invention.

The frequency variation of the transmission signal and the reception signal is shown in FIG. 8. The frequency pulse generation time t1 of the transmission signal and the frequency pulse reception time t2 of the reception signal are recorded, and their time difference ($\Delta t = \mu 1 - t2$) is calculated. Next, it is possible to measure the distance between the host vehicle and the preceding vehicle through the following equation.

$$D = C \times \Delta t / 2 \qquad (19)$$

Where D is a distance to the forward object, Δt is a pulse modulation time interval and C is the speed of light $3 \times 10^8$ m/s.

Figure 9:
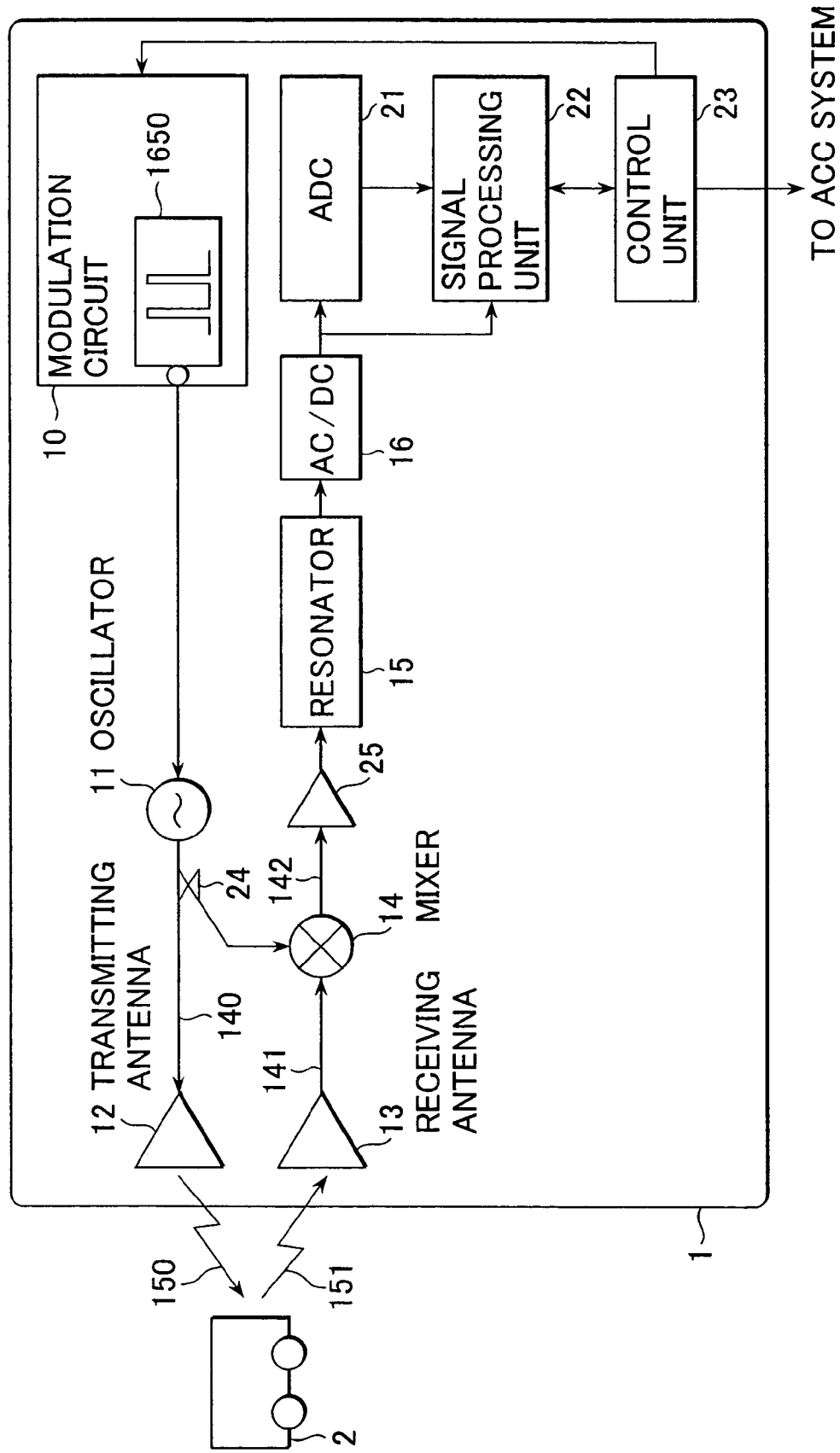
FIG. 9 is a view illustrating a constitution of a millimeter wave radar system according to a modified example of one embodiment of the present invention.

FIG. 9 is a block diagram of a radar system for realizing this method, and is a view extracting and illustrating a circuit constitution used in the frequency pulse CW method in FIG. 1. The modulation signal 1650 is output from the modulation circuit 10. Here, fp3 in FIG. 8 is set to be equal to the frequencies of the IF signal pulses a, b as shown in FIG. 2 to pass through the resonator 15.

The IF signals passing through the resonator 15 are further converted into DC signals by the AC/DC converter 16 at a later stage, and thus the rectangular shaped wave signals shown in FIG. 8 as the output of the AC/DC converter can be obtained. By measuring the generation time interval of the signals, the aforementioned times t1, t2 can be obtained. The measurement of time difference of these signals can be performed in the signal processing unit 22 by interrupting the falling of the rectangular shaped wave signal or the edges of the falling signal and acquiring values of the built-in timer at that time.

As another measuring method, by sampling the signals at a period sufficiently shorter than the signal generation time interval in the ADC 21 and monitoring the signal amplitude, the time interval can be measured. In this case, the S/H circuit is unnecessary.

Figure 10:
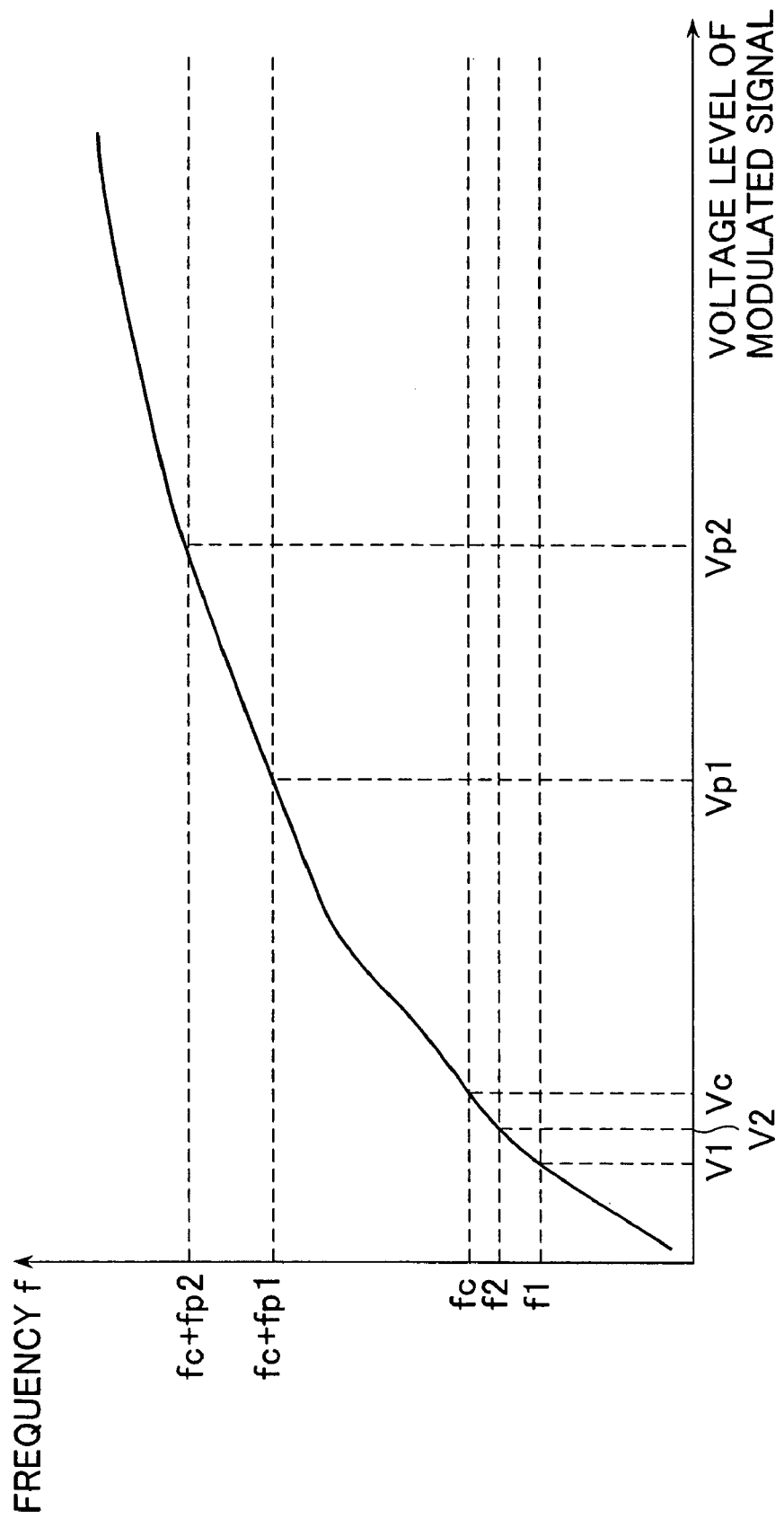
FIG. 10 is a view illustrating a relationship between a voltage level of a modulation signal output from a modulation circuit and a transmitter frequency.

FIG. 10 shows a relationship of the voltage level of the modulation signal output from the modulation circuit and the frequency of the transmitter. The two-frequency CW method uses two frequencies f1, f2 and the frequency pulse CW method uses three frequencies fc, fc+fp1, fc+fp2. In case of a transmitter of millimeter wave band, the modulation signal voltage may not maintain the linearity with the transmission frequency, and a special frequency control circuit may be required to ensure the linearity, depending on the modulation method such as the FM-CW method. In the present method, the special frequency control circuit is not required for ensuring the linearity. The transmission frequency can be controlled by storing the relationships of various modulation signal levels and the transmission frequency in a memory of the signal processing circuit in advance and then switching these voltages properly. In brief, the circuit can be constructed inexpensively.

Figure 19:
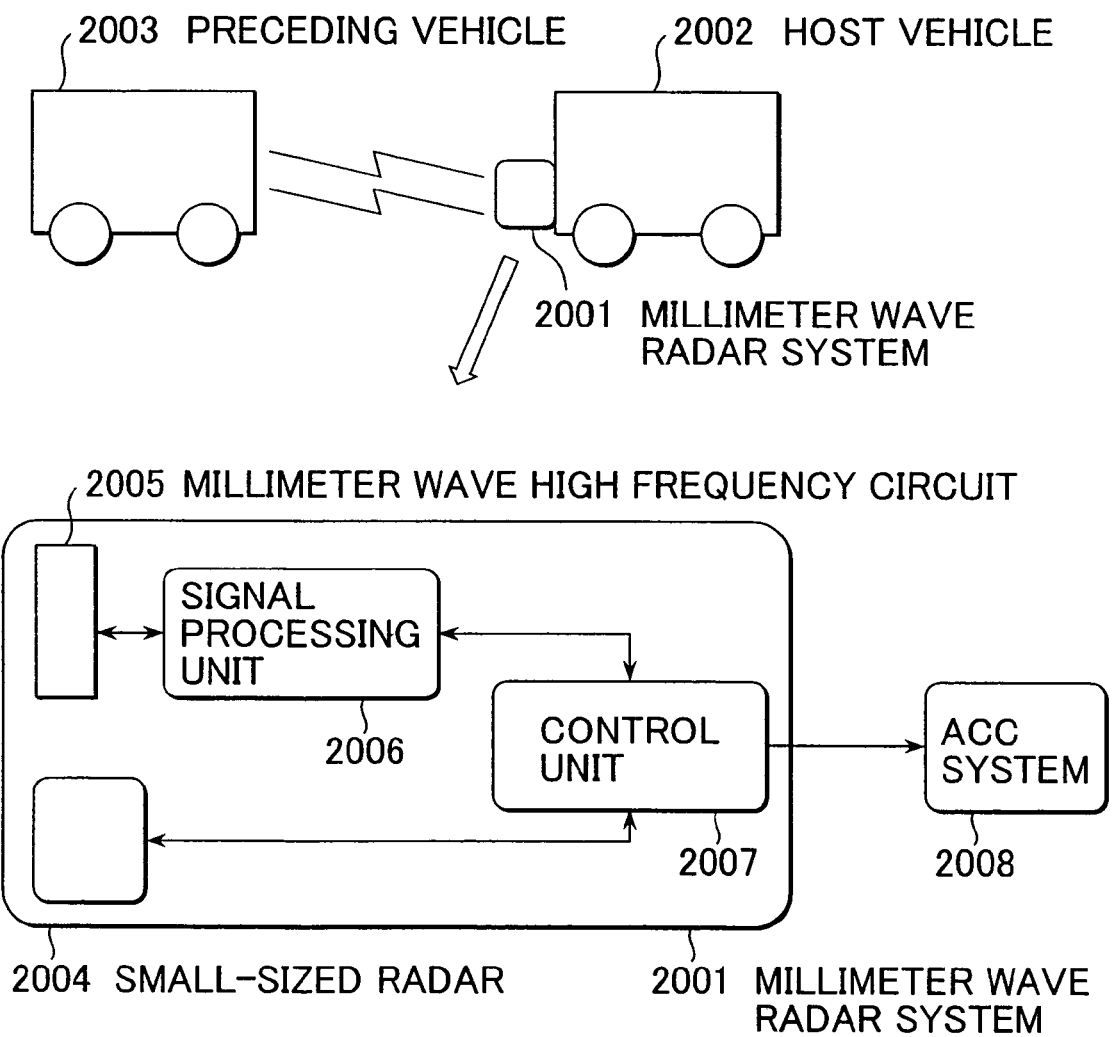
FIG. 19 is a block diagram of a millimeter wave radar system provided with a small-sized radar.

Next, a millimeter wave radar system according to another embodiment of the present invention is shown in FIG. 19.

The millimeter wave radar system 2001 is provided in a host vehicle 2002 and measures a distance and a relative speed between a preceding vehicle 2003 and a host vehicle 2002. The millimeter wave radar system 2001 comprises a millimeter wave high-frequency circuit 2005, a signal processing unit 2006, and a control unit 2007.

Herein, the millimeter wave high-frequency circuit 2005 and the signal processing unit 2006 are circuit blocks based on the two-frequency CW modulation method, and a small-sized radar 1904 is a circuit block based on the FM-CW modulation method.

The control unit 2007 calculates the accurate information of the distance and the relative speed between the host vehicle and the preceding vehicle using a decision logic (which is described later) based on the distance information and the relative speed information obtained from the signal processing unit 2006 and the distance information obtained from the small-sized radar, and transmits the calculated information to an ACC system 2008.

As compared with the circuit system of the two-frequency CW modulation method, the small-sized radar need not detect the distance and the relative speed between a host vehicle and a preceding target at a long distance but detect the target even if the relative speed between the host vehicle and the preceding vehicle is 0.

Figure 20:
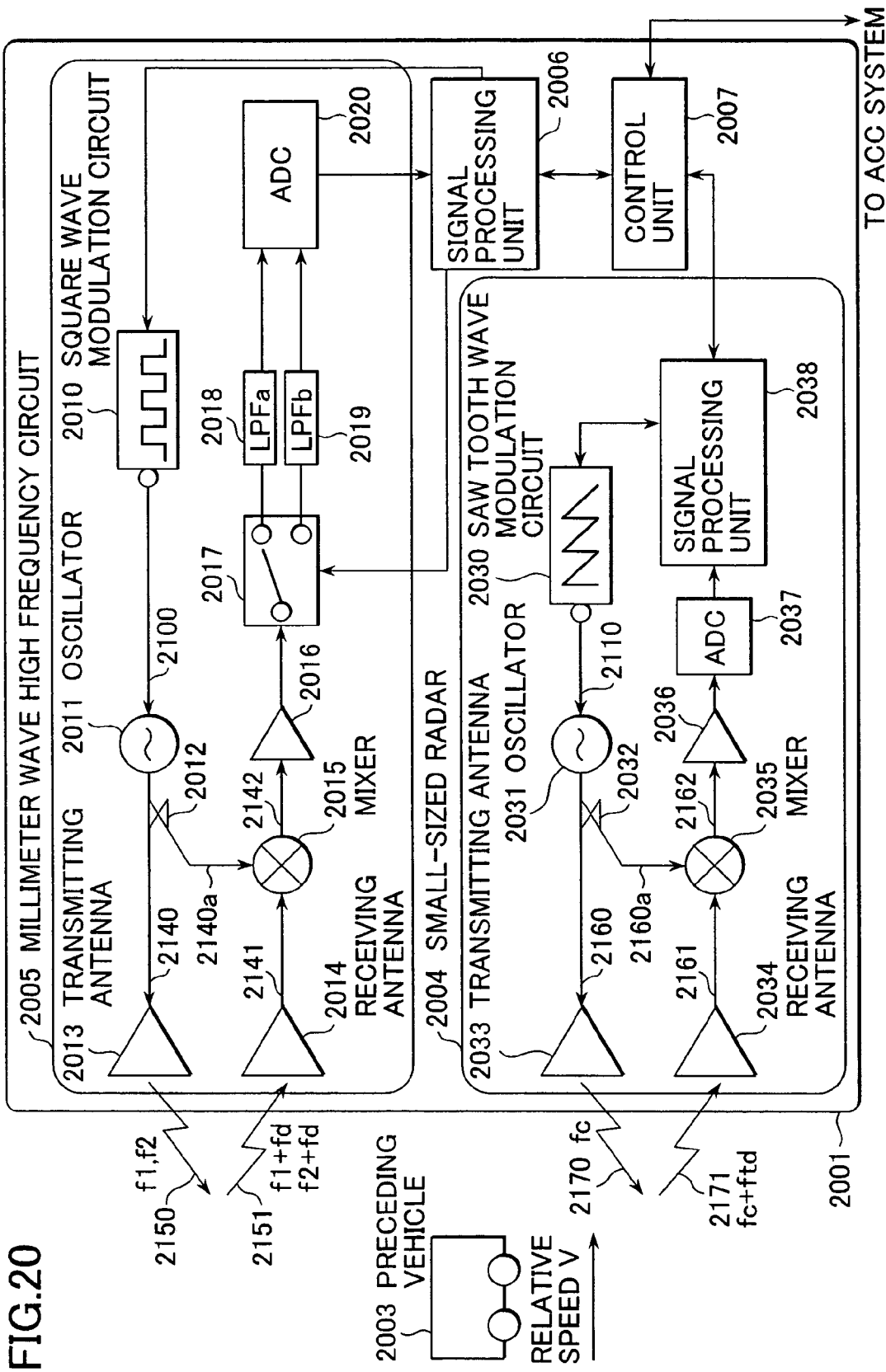
FIG. 20 is a detailed block diagram of the millimeter wave radar system provided with the small-sized radar.

FIG. 20 is a detailed circuit block of the millimeter wave radar system 2001 according to the present invention. The millimeter wave high-frequency circuit 2005 comprises a oscillator 2011 for oscillating a millimeter wave transmission signal 2140, a transmitting antenna 2013 for radiating the millimeter wave transmission radio wave 2150, a square wave modulation circuit 2010 for modulating a oscillation frequency of the millimeter wave transmission radio wave, a receiving antenna 2014 for receiving a millimeter wave reception radio wave 2151 reflected from the preceding vehicle 2003, a mixer 2015 for receiving the a reception signal 2141 and the transmission signal 2140a divided from a directional coupler 2012 to generate an IF signal 2142, an amplifier 2016 for amplifying the IF signal, a switching circuit 2017, an ADC (AD converter) circuit 2020 for receiving signals from a LPFa (low pass filter a) 2018 and a LPFb (low pass filter b) 2019, and a signal processing unit 2006 for controlling the switching circuit 2017 and for receiving a digital signal value of the IF signal from the ADC circuit 2020 to calculate the distance and the relative speed between the host vehicle and the preceding vehicle. The millimeter wave high-frequency circuit 2005 and the signal processing unit 2006 are circuit blocks for implementing a signal processing system of the two-frequency CW method.

On the other hand, the small-sized radar 2004 comprises an oscillator 2031 for oscillating a millimeter wave transmission signal 2160, a transmitting antenna 2033 for radiating a millimeter wave transmission radio wave 2170, a saw tooth wave modulation circuit 2030 for modulating an oscillation frequency of the millimeter wave transmission radio wave, a receiving antenna 2034 for receiving a millimeter wave reception radio wave 2171 reflected from the preceding vehicle 2003, a mixer 2035 for receiving the a reception signal 2161 and the transmission signal 2160a divided from a directional coupler 2032 to generate an IF signal 2162, an amplifier 2036 for amplifying the IF signal, an ADC circuit 2037, and a signal processing unit 2038 for receiving a digital signal value of the IF signal transmitted from the ADC circuit 2037 to calculate the distance between the host vehicle and the preceding vehicle. The small-sized radar 2004 is a circuit block for implementing a signal processing system of the FM-CW method.

Next, the preceding vehicle detection means according to this embodiment will be described. In this embodiment, the signal processes of the two-frequency CW method and the FM-CW method are used in combination. That is, when an absolute value of the relative speed V between the host vehicle and the preceding vehicle is more than a predetermined value, the preceding vehicle is detected by the two-frequency CW method, and when the absolute value of the relative speed V is lower than the predetermined value, the preceding vehicle is detected by the two-frequency CW method and the FM-CW method. Now, the principle of operation thereof will be described.

In FIG. 20, the millimeter wave high-frequency circuit 2005 and the signal processing unit 2006 is a signal processing system of the two-frequency CW method. The millimeter wave transmission signal 2140 (of which the frequencies are f1 and f2) generated from the millimeter oscillator 2011 passes through the directional coupler 2024 and is radiated from the transmitting antenna 2012.

In addition, the directional coupler 2024 distributes a portion of the transmission signal to the mixer 2015. The millimeter wave oscillator 2011 oscillates the transmission signal 2140, which is modulated by the square wave modulation circuit 2010 and has two kinds of frequency f1, f2.

The millimeter wave transmission signals 2150 radiated from the transmitting antenna 2012 is subjected to the Doppler shift by the preceding vehicle 2003, and then become millimeter wave reception signals 2151 (of which the frequencies are f1+fd, f2+fd). The receiving antenna 2014 receives the millimeter wave reception signal 2151 as a reception signal 2141. The mixer 2015 mixes the reception signal 2141 with a portion of the transmission signals 2140a divided by the directional coupler 2012 to generate the IF signal 2142 (including Doppler signal (of which the frequency is fd)). Then, the IF signal 2142 is amplified by the amplifier 2016. The analog switch 2017 switches in synchronism with a square wave modulation signal 2100.

That is, the analog switch 2017 switches the IF signal 2142 to the LPFa 2018 when the frequency of the millimeter wave oscillator 2011 is f1, and to the LPFb 2019 when the frequency of the millimeter wave oscillator 2011 is f2. The LPFa 2018 generates a Doppler signal (of which the frequency is fd1) when the frequency of the millimeter wave oscillator 2011 is f1, and the LPFb 2019 generates a Doppler signal (of which the frequency is fd2) when the frequency of the millimeter wave oscillator 2011 is f2. The Doppler signals are digitalized by the ADC 2020 and is FFT-analyzed by the signal processing unit 2006, so that the frequency fd1 and the phase $\Phi 1$, and the frequency fd2 and the phase $\Phi 2$ of the Doppler signals can be obtained. Herein, the distance R and the relative speed V between the host vehicle and the preceding vehicle 2003 can be calculated by Equation (20).

$$V = C \times fd1/(2 \times f1) \text{ or } V = C \times fd2/(2 \times f2) \tag{20}$$

where, C is the propagation speed of a radio wave.

In addition, an inter-vehicle distance R can be calculated by Equation (21).

$$R = C \times (\Phi 1 - \Phi 2)/(4\pi \Delta f) \tag{21}$$

Herein, the information on the detected distance and relative speed between the host vehicle and the preceding vehicle is transmitted to the control unit 2007.

Next, the detection method when the absolute value of the relative speed is less than a predetermined value or is "0" will be described. As described above, in the two-frequency CW method, the preceding vehicle is detected using the Doppler signal, but when the relative speed is close to "0", it is difficult to detect the preceding vehicle. Therefore, the small-sized radar equipped with the signal processing system of the FM-CW modulation method that is capable of obtaining the IF signal of the preceding vehicle even if the relative speed is "0" is used.

Figure 21:
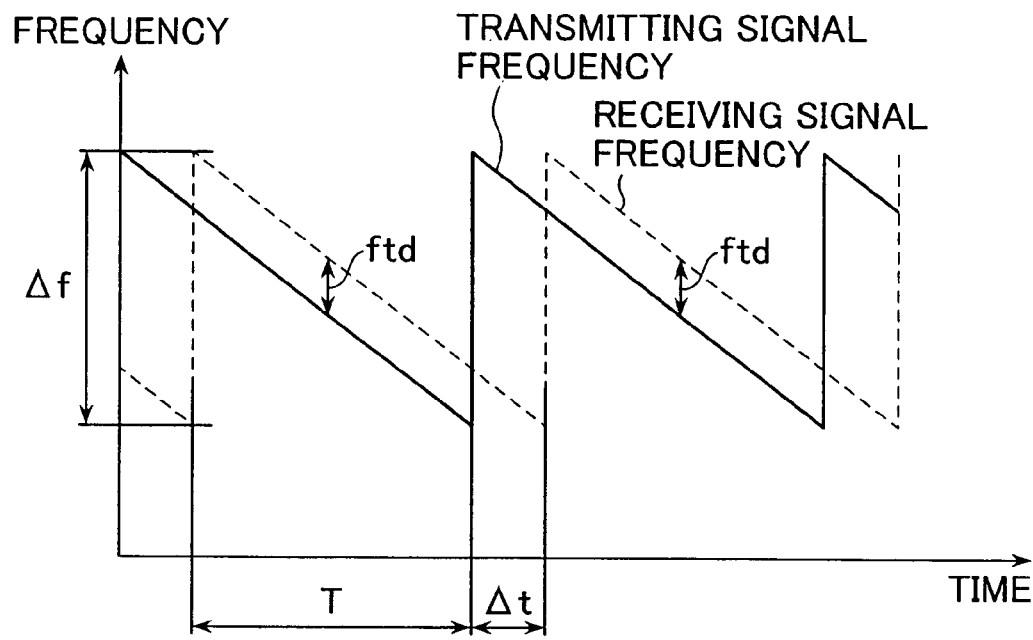
FIG. 21 shows a FM-CW type modulation method.

Referring to FIG. 21, the detection principle of the FM-CW method to be implemented in the small-sized radar will be described.

Figure 22:
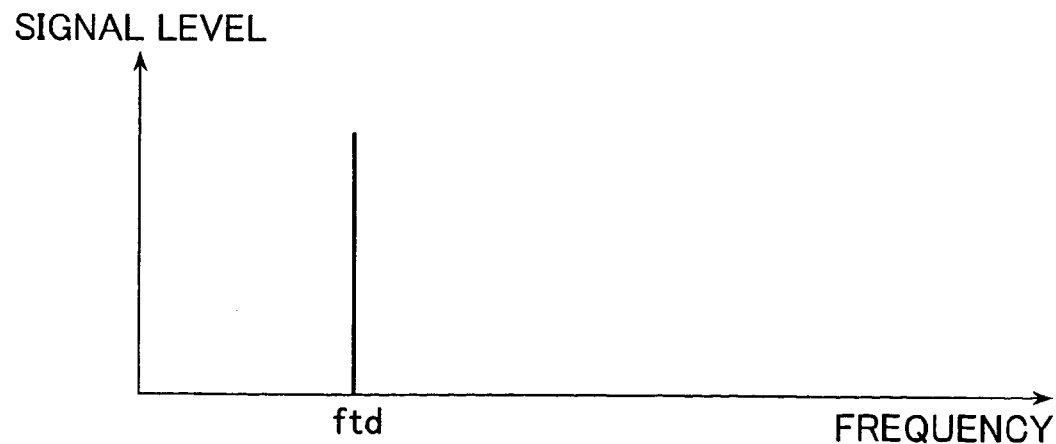
FIG. 22 shows a frequency spectrum based on the FM-CW type modulation method.

The oscillation frequency of the transmission signal 2160 is modulated into a saw tooth wave by the saw tooth wave modulation signal 2110 (a solid line in FIG. 21). The reception signal 2161 is delayed by time difference $\Delta t$ until the millimeter wave transmission signal 2170 radiated from the transmitting antenna 2033 is reflected from the preceding vehicle 2003 and reaches the receiving antenna 2034 (a dotted line in FIG. 21). Herein, the frequency difference ftd between the frequency of the transmission signal 2160 and the frequency of the reception signal 2161 is proportional to the magnitude of $\Delta t$. In addition, since $\Delta t$ is proportional to the distance between the preceding vehicle and the radar, it is possible to calculate the distance between the radar and the preceding vehicle by obtaining the frequency difference ftd. As shown in FIG. 22, by FFT analysis of the IF signal 2162, it is possible to obtain the spectrum of the frequency ftd.

When the distance between the radar and the preceding vehicle is R, the width of the modulation frequency is $\Delta f$ and the modulation repeating period is T, the following equation is established.

$$ftd/\Delta f = \Delta t/T \tag{22}$$

and $$\Delta t = 2R/C \tag{23}$$

(C is the propagation speed of a radio wave (light speed)) Therefore, $$R = ftd \times C \times T/(2 \times \Delta f) \tag{24}$$

and $$ftd = 2 \times R \times \Delta f/(C \times T) \tag{25}$$

Herein, Equations (22) to (25) are established when the relative speed between the radar and the preceding vehicle is 0. If a relative speed exists and thus the Doppler frequency fd is generated, Equations (24) and (25) are amended as the following Equations (26) and (27).

$$R = ftd' \times C \times T/(2 \times \Delta f) \tag{26}$$

$$ftd' = 2 \times R \times \Delta f/(C \times T) + fd \tag{27}$$

In the configuration of the small-sized radar 2004 shown in FIG. 20, the saw tooth wave modulation circuit 2030 modulates the frequency fc of the transmission signal 2160 of the oscillator 2031 into a saw tooth wave. The millimeter wave transmission signal 2170 transmitted from the transmitting antenna 2033 is frequency-shifted by the frequency difference ftd in accordance with the distance R, and the frequency-shifted signal is received as the millimeter wave reception signal 2171 by the receiving antenna 2034. The mixer 2035 mixes the reception signal 2161 with the transmission signal 2160 to obtain the IF signal 2162 of the frequency ftd.

The IF signal 2162 is digitalized by the ADC circuit 2037 and then is FFT-analyzed by the signal processing unit 2038 to obtain the spectrum of the frequency ftd. Thus, the distance R can be obtained from Equation (24).

In the FM-CW modulation method of the present invention, it is difficult to separately obtain the fd, which is generated by the relative speed V, and the ftd, which is generated by the time difference, but if the fd is sufficiently smaller than the ftd (if the relative speed is sufficiently small), the ftd' (ftd+fd) can be treated as the ftd.

As described above, when the relative speed V is large, the distance R and the relative speed V between the radar and the preceding vehicle can be obtained by the conventional signal processing system of two-frequency CW method, and when the relative speed is 0 in the ACC traveling, the small-sized radar, which implements the signal processing system of the FM-CW method detects the inter-vehicle distance, so that the distance R is corrected. Herein, in the ACC traveling, when the host vehicle repeats stop operation and low-speed traveling operation (Stop and Go traveling in a traffic following), the distance between the host vehicle and the preceding vehicle becomes small. Thus, the small-sized radar may carry out only a short-distance detection, so the long distance detection is not required necessarily.

In this case, similar to the signal processing system of the two-frequency CW method for detecting the long distance, since it is not necessary to enlarge the antenna size in order to focus the transmission beam, the antenna size may be small. Furthermore, if an accurate distance precision is not required, the accurate linearity of the saw tooth wave modulation is not required. Thus, the additional circuits, such as a phase lock circuit, are not necessary. Furthermore, as compared with the two-frequency CW method, the FM-CW method does not require the switch circuit and the LPF. Thus, it is possible to decrease the circuit size.

Therefore, as shown in FIGS. 19 and 20, the signal processing system of the FM-CW method may be packed in one package to form the small-sized radar. Furthermore, in another aspect of the signal processing system of the FM-CW method, all elements are not accommodated in one package, but the elements may be separately provided in the millimeter wave radar system 2001 with the same circuit construction.

Next, referring to FIG. 23, the control flow for the radio wave radar system according to the first embodiment of the present invention will be described. Normally, the IF signal of the two-frequency CW method is FFT-analyzed (step 2501), and a spectrum is extracted (step 2502). The relative speed is calculated from the frequency information of the spectrum, and the distance is calculated from the phase information of the spectrum (step 2503). Next, when a preceding vehicle is not detected because the relative speed is 0, that is, the spectrum of the preceding vehicle is not extracted (step 2504), non-detection flag A becomes ON (step 2507), and then step 2511 is performed.

When a preceding vehicle is detected, the non-detection flag A becomes OFF (step 2505), and the information on the detected preceding vehicle is registered on a list (step 2506). Next, when the absolute value of the relative speed of the preceding vehicle is equal to or less than a predetermined threshold value a (step 2508), step 2511 is performed. When the absolute value of the relative speed is equal to or greater than $\alpha$, the preceding vehicle information to be transmitted from the registered list to the ACC system is selected (step 2509), and the preceding vehicle information is transmitted to the ACC system (step 2510).

In step 2511, the IF signal of the FM-CW method is FFT-analyzed, and a spectrum is extracted (step 2512). Then, the detection distance is calculated from the frequency information of the spectrum (step 2513). When the preceding vehicle is not detected (step 2514), the non-detection flag B is made to be ON (step 2515), and the step 2518 is performed. When the preceding vehicle is detected, the non-detection flag B is made to be OFF (step 2516), and the information on the detected preceding vehicle is registered on the list (step 2517).

Next, when the non-detection flag A and flag B are all ON (step 2518), a preceding vehicle is not detected by the two kinds of detection methods. In this case, the non-detection flag A and flag B are all made to be OFF (step 2519), and the information indicative of the nonexistence of a preceding vehicle is transmitted to the ACC system (step 2520).

Summarizing the above steps, when a preceding vehicle exists and the relative speed is equal to or greater than a predetermined value, the distance and the relative speed between the host vehicle and the preceding vehicle are calculated by only the two-frequency CW method. When the absolute value of the relative speed of the preceding vehicle falls within a range of 0 to $\alpha$, the FM-CW method is used in combination with the two-frequency CW method. Thus, it is possible to detect the preceding vehicle, which is an optimal ACC target, from the detection results by both methods, and to transmit the information to the ACC system.

Figure 7:
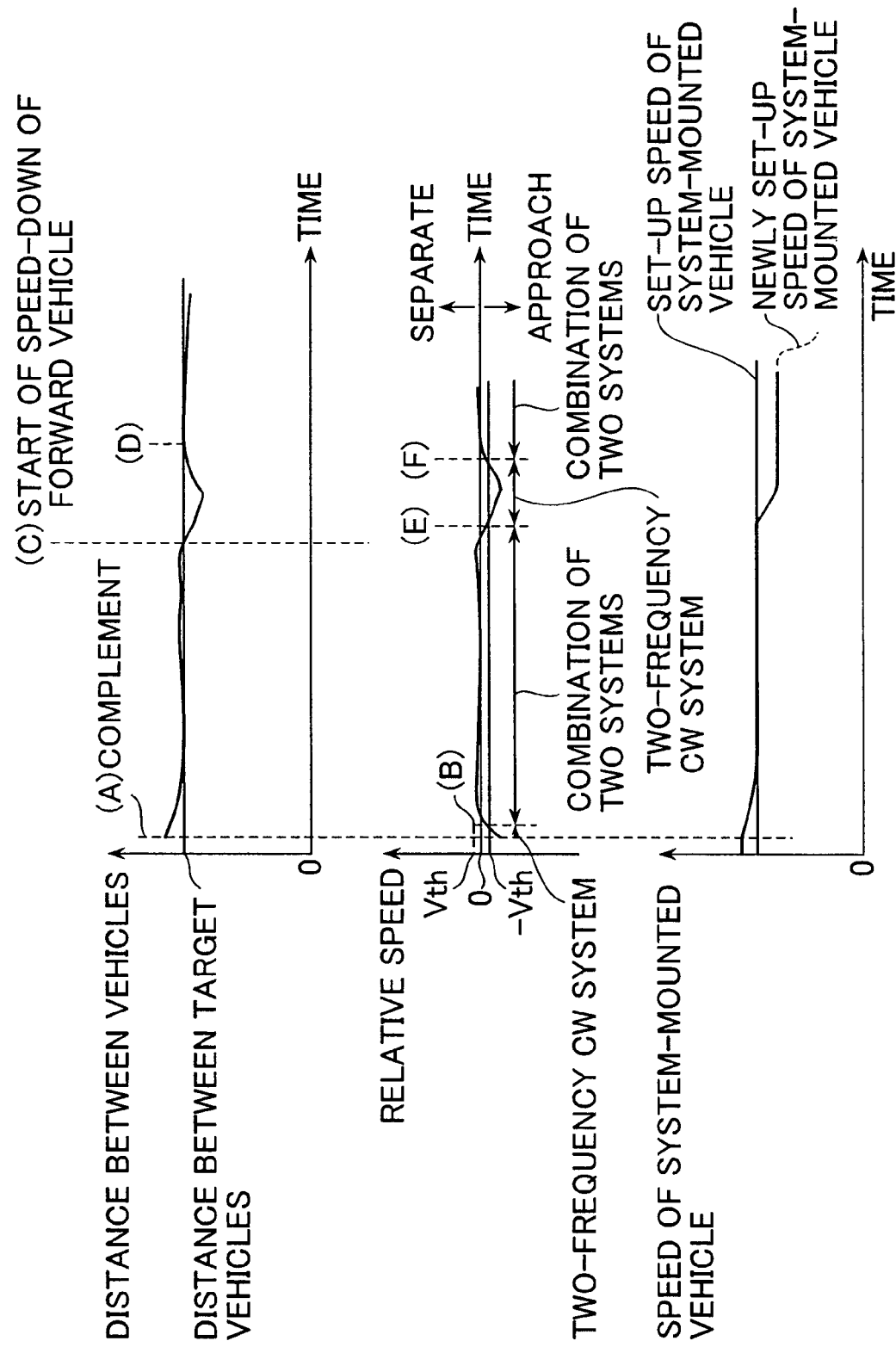
FIG. 7 is a view illustrating a time dependence of a distance between the two vehicles, a relative speed and a host vehicle speed in a millimeter wave radar system according to one embodiment of the present invention.
Figure 18:
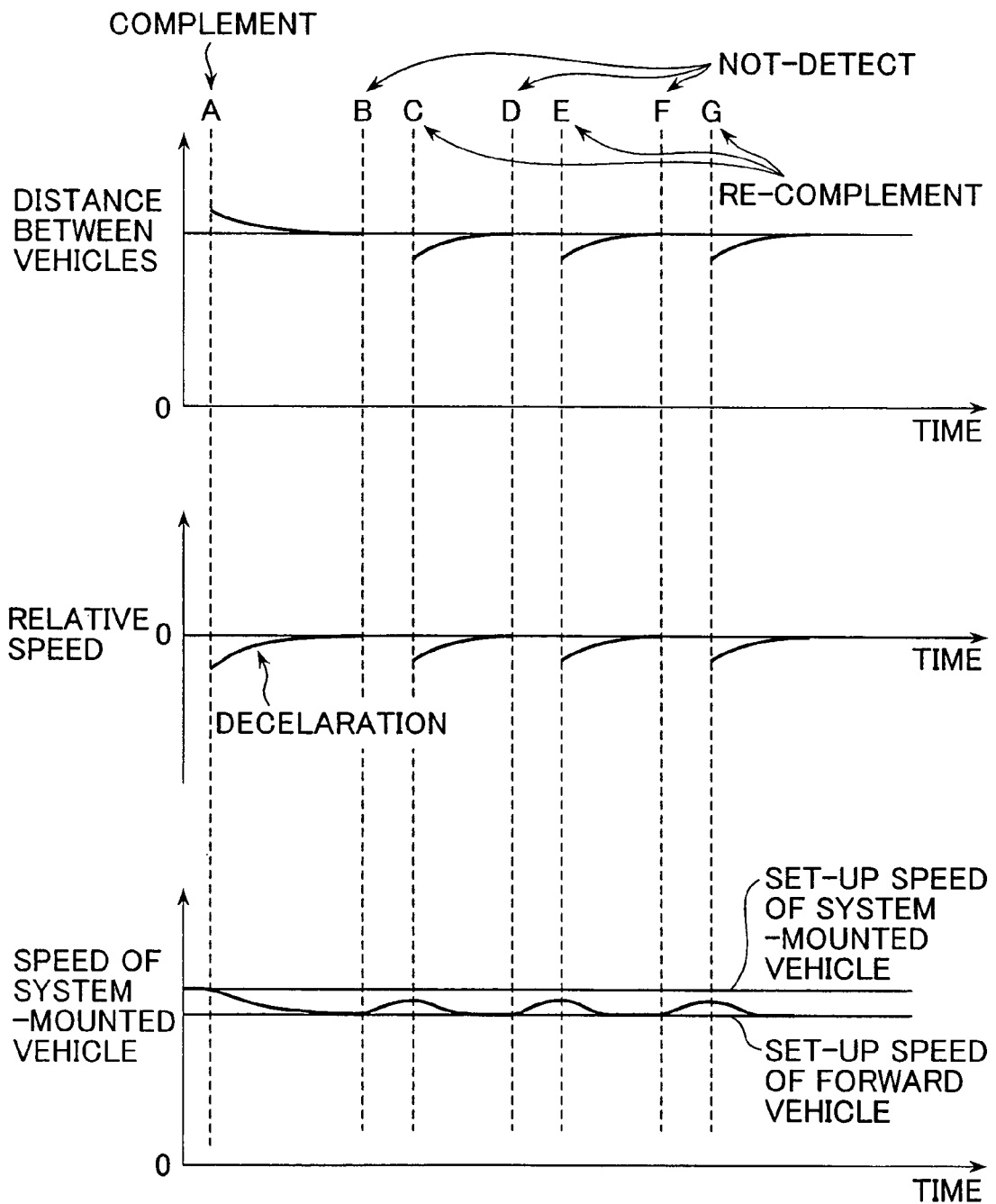
FIG. 18 is a view illustrating time variations of a distance between the two vehicles, a relative speed and a host vehicle speed when the ACC control is carried out using a millimeter wave radar of the two-frequency CW modulation method.

A time dependence (corresponding to FIG. 18) of the inter-vehicle distance, the relative speed, and a speed of the host vehicle in the ACC control using the aforementioned technologies is shown in FIG. 7. When the real distance between the two vehicles is greater than the target distance between the two vehicles and the preceding vehicle is traveling at a speed lower than the host vehicle (point A), the host vehicle decelerates to keep the distance between the two vehicles constant.

By doing so, the relative speed is close to "0". Since the preceding vehicle cannot be detected by the two-frequency CW modulation method if the absolute value of the relative speed is less than a threshold value (Vth) (point B), the existence or nonexistence of the preceding vehicle can be checked by using the frequency pulse CW modulation method in combination at a point of time prior thereto or switching to the frequency pulse CW modulation method.

Next, when the preceding vehicle varies its traveling speed (speed down) and the like, if, for example, the real distance between the two vehicles is less than the target distance between the two vehicles at a point of time (point C), the host vehicle decelerates to be close to the target distance between the two vehicles. At that time, the relative speed between two vehicles becomes greater toward each other, and if the absolute value of the relative speed is greater than a threshold value (Vth) (point E), the relative speed between two vehicles can be detected using the two-frequency CW modulation method again. Thus, the control is performed to be close to the target distance between the two vehicles (point D). Herein, at the point F, by changing the two-frequency CW method into combination of two methods, the host vehicle can stably travel at a newly set-up speed of the host vehicle again.

When the ACC control is performed as aforementioned, a situation in which the preceding vehicle cannot be detected even if being close to the target distance between the two vehicles will not occur, and thus the traveling of the host vehicle is stabilized. Furthermore, when the real distance between the two vehicles becomes greater than the target distance between the two vehicles at any point of time, it is true that the same stabilization is provided.

Figure 12:
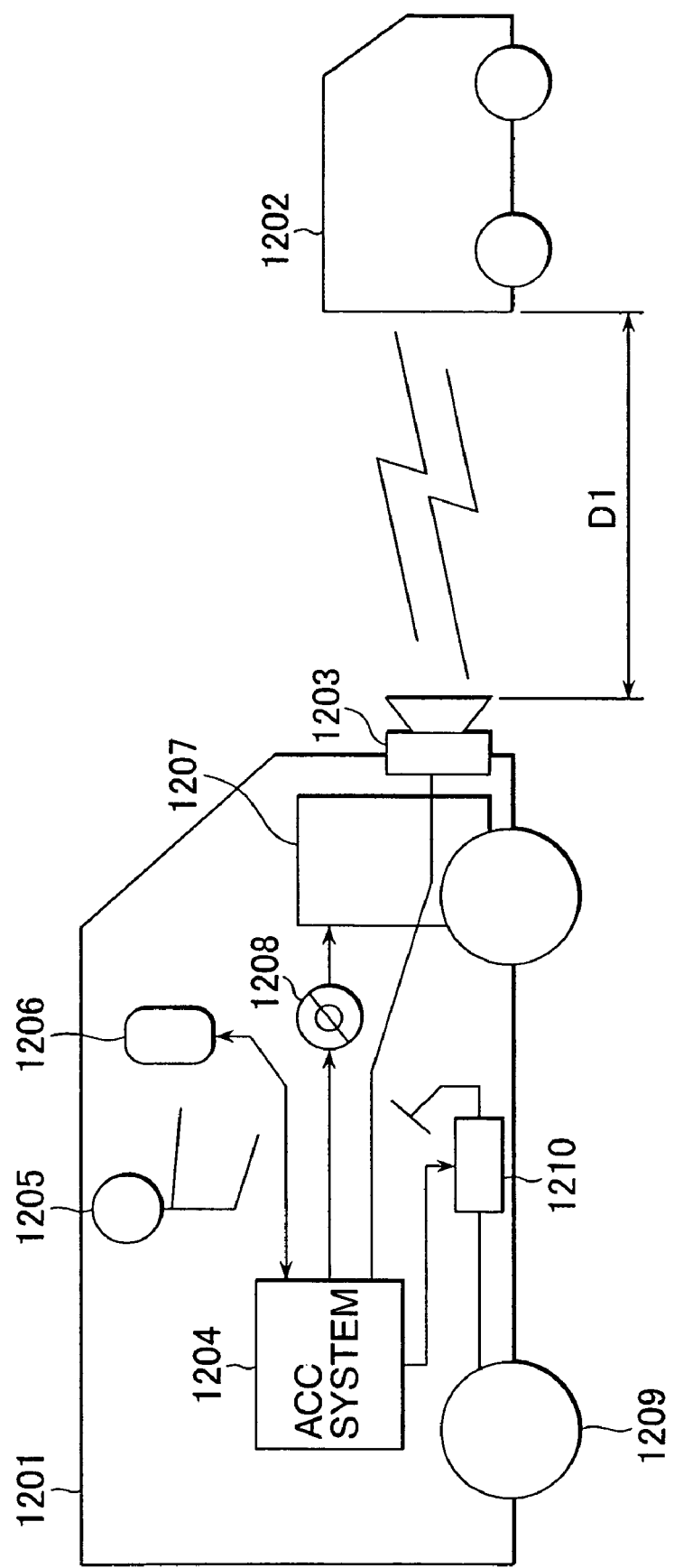
FIG. 12 is a view illustrating a constitution of an adaptive cruise control (ACC) system.

Next, a constitutional example and a flow for the operation of the ACC system equipped with the millimeter wave radar system according to the first embodiment of the present invention will be described with reference to FIGS. 12 and 13.

A preceding vehicle 1202 is traveling (a distance D1 ahead) in front of the host vehicle 1201. A millimeter wave radar system 1203 measures a distance between the host vehicle and the preceding vehicle 1202 and transfers the information through a communication line to an ACC system 1204. A driver 1205 sets up the distance between the two vehicles which is to be ensured for the preceding vehicle by use of a control panel 1206. The ACC system 1204 compares the distance between the two vehicles which is set up by the driver with the distance measured by the millimeter wave radar 1203 in order to ensure the set-up distance between the two vehicles, and controls an accelerator throttle 1208 for controlling the output of an engine 1207 and a brake actuator 1210 for braking vehicle wheels 1209.

Figure 13:
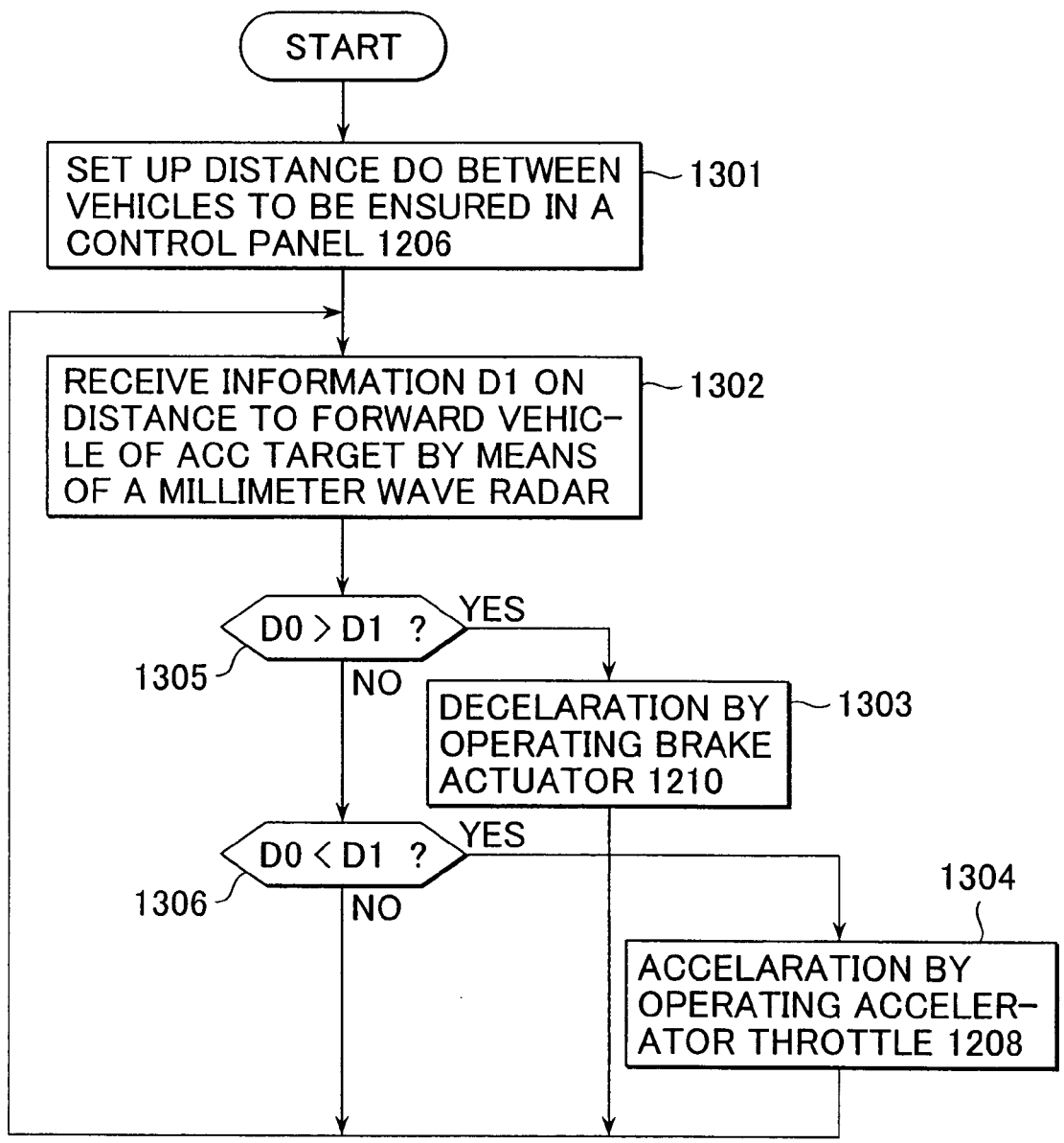
FIG. 13 is a control flowchart of the adaptive cruise control (ACC) system.

FIG. 13 is a flowchart illustrating a flow of control operation of the ACC system 1204. First, the distance D0 between the two vehicles which is to be ensured is set up by the control panel 1206 (step 1301). Subsequently, the millimeter wave radar receives the distance information D1 of the preceding vehicle, i.e., the ACC target (step 1302). When the set-up distance between the two vehicles is D0>D1 (step 1305), the brake actuator 1210 operates to decelerate the host vehicle (step 1303). When the set-up distance between the two vehicles is D0<D1 (step 1306), the accelerator throttle 1208 is operates to accelerate the host vehicle (step 1204). Through the above processes, the ACC system 1204 enables the traveling of following the preceding vehicle 1202 while maintaining the distance D0 between vehicles set up by the driver 1205.

As describe above, with the radio wave radar system according to embodiments of the present invention, advantages of the two-frequency CW modulation method can be made best use of. Furthermore, even if the relative speed is equal to or less than a predetermined threshold value to be equal to or less than a detection limit, being a disadvantage thereof, it is possible to detect existence of a preceding vehicle by using in combination with the frequency pulse CW modulation method. In addition, it is possible to realize a system having a good accuracy by merely adding inexpensive circuits for the frequency pulse CW modulation method to circuits in the two-frequency CW modulation method and by constructing a simple signal processing circuit.

Furthermore, in the embodiments of the present invention, the two-frequency CW modulation method and the frequency pulse CW modulation method, or a combination of the two-frequency CW modulation method and the frequency pulse CW modulation method have been exemplified. However, if there is another detection method capable of detecting a preceding vehicle when the relative speed between the host vehicle and the preceding vehicle is 0, the objects of the present invention can also be accomplished by a combination of the two-frequency CW modulation method and another method, by which a preceding vehicle can be detected when the relative speed is 0.

However, the frequency pulse CW modulation method and the FM-CW modulation method of the present invention can be realized by a simple circuit configuration. Furthermore, if the detection range is limited to a short range, the size of the antenna can be set to be small, and thus the circuit system of another method, which is packed in one package, is provided within the radar of the conventional two-frequency CW modulation method. Furthermore, if a distance detecting function with a high accuracy or a function of directly calculating the relative speed from the IF signal is not required, it is possible to realize an inexpensive circuit configuration.

Furthermore, in this embodiment, vehicles are selected as the operating objects, but other mobile bodies may be selected as the operating objects. In addition, other various modifications can be made.

According to the present invention, advantages of the two-frequency CW modulation method can be used, and other modulation method (frequency pulse CW modulation method or FM-CW modulation method) can be used to detect existence or nonexistence of a preceding vehicle even if the relative speed is equal to or less than a predetermined threshold value. Therefore, it is possible to realize a stable traveling of following a preceding vehicle.

What is claimed is:

1. A radio wave radar system for obtaining at least one of a distance and a relative speed between a host vehicle and a forward object, comprising:

modulation means for modulating a transmitting radio wave frequency;

means for identifying a phase information and a frequency information of a received reflection wave corresponding to the transmission frequency; and control means for switching modulation methods in the modulation means depending on variation of the relative speed between the host vehicle and the forward object.

2. A radio wave radar system according to claim 1, wherein:

when the relative speed between the host vehicle and the forward object is higher than a predetermined threshold value, the control means selects a first modulation method suitable for a case where the relative speed between the host vehicle and the forward object is higher than the predetermined threshold value; and when the relative speed between the host vehicle and the forward object is lower than the predetermined threshold value, the control means selects one of i) said first modulation method, and ii) said first modulation method and a second modulation method that is suitable for a case where the relative speed between the host vehicle and the forward object is lower than the predetermined threshold value.

3. A radio wave radar system according to claim 2, wherein:

the control means switches between a two-frequency continuous wave (CW) modulation method and a frequency pulse continuous wave (CW) modulation method;

the two-frequency CW modulation method alternately modulates two frequencies and is suitable for a case where the relative speed between the host vehicle and the forward object is higher than a predetermined threshold value; and the frequency pulse CW modulation method modulates a constant frequency into at least two types of separate frequencies only for a short time interval, and is suitable for a case where the relative speed between the host vehicle and the forward object is lower than a predetermined threshold value.

4. A radio wave radar system according to claim 3, wherein a pulse generation time interval in the frequency pulse CW modulation method is determined on the basis of a phase information of an intermediate frequency signal obtained when the two-frequency CW modulation method is used.

5. A radio wave radar system according to claim 3, wherein:

distance between the host vehicle and the forward object is calculated from a phase information of an intermediated frequency signal obtained when the two-frequency CW modulation method is used; and the frequency pulses have the same pulse generation time interval as a reciprocating time for the radio wave signal radiated from the radar to be reflected from the forward object and returned.

6. A radio wave radar system according to claim 3, further comprising frequency pulse continuous wave modulation means for performing a modulation such that differences between respective frequencies of frequency pulses are equal.

7. A radio wave radar system according to claim 3, further comprising:

frequency filter means for passing any frequency signal of the intermediate frequency signals obtained by the frequency pulse CW modulation means;

signal converting means for converting amplitudes of the intermediate frequency signals into DC voltage signals; and signal processing means for detecting existence or non-existence of the DC voltage signals.

8. A radio wave radar system according to claim 2, wherein the frequency modulation means suitable for a case where the relative speed between the host vehicle and the forward object is higher than the predetermined threshold value uses the two-frequency CW modulation method of alternately modulating two frequencies.

9. A radio wave radar system according to claim 2, wherein the frequency modulation means suitable for a case where the relative speed between the host vehicle and the forward object is lower than the predetermined threshold value uses a FM-CW modulation method of linearly modulating a frequency.

10. A radio wave radar system according to claim 1, wherein the control means switches the modulation method to frequency pulse CW modulation, in which a constant frequency is modulated into at least two types of separate frequencies only for a short time.

11. A radio wave radar system for obtaining at least one of a distance and a relative speed between a host vehicle and a forward object, comprising:

modulation means for modulating a transmitting radio wave frequency;

means for identifying a phase information and a frequency information of a received reflection wave corresponding to the transmission frequency; and control means for switching modulation methods in the modulation means depending on variation of the relative speed between the host vehicle and the forward object; wherein said system further comprises at least two frequency modulation means and signal processing means, the at least two frequency modulation means and signal processing means including frequency modulation means and signal processing means, which are suitable for a case where the relative speed between the host vehicle and the forward object is higher than a predetermined threshold value, and frequency modulation means and signal processing means, which are suitable for a case where the relative speed between the host vehicle and the forward object is lower than a predetermined threshold value; and the control means selects the distance and the relative speed between the host vehicle and the forward object based on the signal processing results obtained from the frequency modulation means and the signal processing means.

12. A radio wave radar system according to claim 11, wherein the control means selects the signal processing result obtained from the frequency modulation means and the signal processing means, which are suitable for a case where the relative speed between the host vehicle and the forward object is higher than the predetermined threshold value, when the relative speed between the host vehicle and the forward object is higher than a predetermined threshold value, and selects the signal processing result obtained from the frequency modulation means and the signal processing means, which are suitable for a case where the relative speed between the host vehicle and the forward object is higher than the predetermined threshold value, or uses the two kinds of frequency modulation means and signal processing means in combination, when the relative speed between the host vehicle and the forward object is lower than a predetermined threshold value.

13. A radio wave radar system according to claim 12, wherein the control means switches a two-frequency continuous wave (CW) modulation method and a frequency pulse continuous wave (CW) modulation method, the two-frequency CW modulation method alternately modulating two frequencies and being suitable for a case where the relative speed between the host vehicle and the forward object is higher than a predetermined threshold value, and the frequency pulse CW modulation method modulating a constant frequency into at least two types of separate frequencies only for a short time interval and being suitable for a case where the relative speed between the host vehicle and the forward object is lower than a predetermined threshold value.

14. A radio wave radar system according to claim 13, wherein a pulse generation time interval in the frequency pulse CW modulation method is determined on the basis of a phase information of an intermediate frequency signal obtained when the two-frequency CW modulation method is used.

15. A radio wave radar system according to claim 13, wherein the distance between the host vehicle and the forward object is calculated from a phase information of an intermediated frequency signal obtained when the two-frequency CW modulation method is used, and the frequency pulse have the same pulse generation time interval as a reciprocating time for the radio wave signal eradiated from the radar to be reflected from the forward object and return.

16. A radio wave radar system according to claim 13, further comprising frequency pulse continuous wave modulation means for performing a modulation such that differences between respective frequencies of frequency pulses are equal.

17. A radio wave radar system according to claim 13, further comprising:

frequency filter means for passing any frequency signal of the intermediate frequency signals obtained by the frequency pulse CW modulation means;

signal converting means for converting amplitudes of the intermediate frequency signals into DC voltage signals; and signal processing means for detecting existence or non-existence of the DC voltage signals.

18. A radio wave radar system according to claim 12, wherein the frequency modulation means suitable for a case where the relative speed between the host vehicle and the forward object is higher than the predetermined threshold value uses the two-frequency CW modulation method of alternately modulating two frequencies.

19. A radio wave radar system according to claim 12, wherein the frequency modulation means suitable for a case where the relative speed between the host vehicle and the forward object is lower than the predetermined threshold value uses a FM-CW modulation method of linearly modulating a frequency.

20. An adaptive cruise control system for controlling brake actuator driving means and accelerator throttle driving means to constantly keep maintaining a distance from a host vehicle equipped with the radio wave radar system on the basis of a distance information from the radio wave radar system according to any one of claims 1 to 19.

21. A radio wave radar system for calculating a distance or a relative speed between a host vehicle and a forward object, comprising:
- modulation means for modulating a transmitting radio wave frequency;
- means for identifying a phase information and a frequency information of a received reflection wave corresponding to the transmission frequency;
- control means for switching modulation methods in the modulation means depending on variation of the relative speed between the host vehicle and the forward object; and
- measuring means for measuring a time difference between a time when the transmission frequency is modulated from an arbitrary frequency to a separate frequency only for a short time and a time when the modulated frequency is received.

22. A radio wave radar system according to claim 21, wherein the control means selects a modulation signal of a two-frequency CW modulation method when an absolute value of the relative speed between the host vehicle and the forward object is equal to or greater than a predetermined value, switches the modulation method into a frequency pulse CW modulation method or uses the two modulation methods in combination when the absolute value of the relative speed is less than a predetermined value.

23. A radio wave radar system for calculating a distance or a relative speed between a host vehicle and a forward object, comprising:
- modulation means for modulating a transmitting radio wave frequency;
- means for identifying a phase information and a frequency information of a received reflection wave corresponding to the transmission frequency; and
- control means for switching a modulation method into a frequency pulse CW modulation method, the frequency pulse CW modulation method modulating an constant frequency into at least two types of separate frequencies only for a short time.

* * * * *